United States Patent
Nonaka et al.

(10) Patent No.: US 8,885,331 B2
(45) Date of Patent: Nov. 11, 2014

(54) PORTABLE ELECTRONIC APPARATUS

(75) Inventors: Keisuke Nonaka, Daito (JP); Atsushi Okamoto, Daito (JP); Akito Iwai, Daito (JP); Kazuhito Fukumasu, Daito (JP); Masahiko Nishiwaki, Daito (JP)

(73) Assignee: KYOCERA Corporation, Kyoto (JP)

( * ) Notice: Subject to any disclaimer, the term of this patent is extended or adjusted under 35 U.S.C. 154(b) by 186 days.

(21) Appl. No.: 13/497,399

(22) PCT Filed: Sep. 24, 2010

(86) PCT No.: PCT/JP2010/066525
§ 371 (c)(1),
(2), (4) Date: Mar. 21, 2012

(87) PCT Pub. No.: WO2011/037176
PCT Pub. Date: Mar. 31, 2011

(65) Prior Publication Data
US 2012/0188726 A1  Jul. 26, 2012

(30) Foreign Application Priority Data

Sep. 28, 2009  (JP) ................................ 2009-222556
Sep. 28, 2009  (JP) ................................ 2009-222557
Sep. 28, 2009  (JP) ................................ 2009-222559

(51) Int. Cl.
*H02B 1/00* (2006.01)
*G06F 1/16* (2006.01)
*H04M 1/02* (2006.01)

(52) U.S. Cl.
CPC ........... *G06F 1/1616* (2013.01); *H04M 1/0237* (2013.01); *G06F 1/1637* (2013.01); *G06F 1/1681* (2013.01); *H04M 1/022* (2013.01)
USPC ............ 361/679.27; 361/679.01; 361/679.02; 361/679.21; 361/679.26

(58) Field of Classification Search
USPC ............ 361/679.27, 679.26, 679.21, 679.02, 361/679.01, 600; 345/1.1, 1.3, 173, 204, 345/205, 206
See application file for complete search history.

(56) References Cited

U.S. PATENT DOCUMENTS 5,847,698 A * 12/1998 Reavey et al. ................. 345/173
5,900,848 A    5/1999 Haneda et al.
(Continued)

FOREIGN PATENT DOCUMENTS

JP   H02-268311 A    11/1990
JP   H04-063494 A    2/1992
(Continued)

OTHER PUBLICATIONS

International Search Report dated Dec. 21, 2010, issued for International Application No. PCT/JP2010/066525.
(Continued)

*Primary Examiner* — Jenny L Wagner
*Assistant Examiner* — Ahmad D Barnes
(74) *Attorney, Agent, or Firm* — Procopio, Cory, Hargreaves & Savitch LLP

(57) ABSTRACT

A portable electronic apparatus includes coupled first and second casings with respective image display surfaces, and including a full-closed state where both casings are overlaid on each other, a tilt state where the second casing has been moved from the full-closed state so that the image display surfaces in both casings are exposed and, also, the image display surface in the second casing is inclined with respect to the image display surface in the first casing at an angle of opening which is equal to or more than 90 degrees but less than 180 degrees, and a full-open state where the image display surfaces in both casings are flushed with each other in the same plane, and the portable electronic apparatus being capable of holding the second casing, in attitude, with respect to the first casing in the full-closed state, in the tilt state and in the full-open state.

14 Claims, 21 Drawing Sheets

(56) References Cited

U.S. PATENT DOCUMENTS

| | | |
|---|---|---|
| 2005/0052834 A1 | 3/2005 | Tanaka et al. |
| 2005/0117284 A1 | 6/2005 | Kida |
| 2007/0164923 A1 | 7/2007 | Kanai et al. |
| 2007/0182663 A1* | 8/2007 | Biech .............................. 345/1.1 |
| 2007/0268264 A1* | 11/2007 | Aarras et al. .................. 345/173 |
| 2008/0125191 A1 | 5/2008 | Nordenskjold |
| 2009/0057007 A1 | 3/2009 | Miyaoka |
| 2009/0091512 A1* | 4/2009 | Jung et al. ...................... 345/1.1 |
| 2009/0103256 A1 | 4/2009 | Takeguchi et al. |
| 2009/0170574 A1* | 7/2009 | Harmon et al. ............ 455/575.4 |
| 2009/0227301 A1 | 9/2009 | Lindvall |
| 2011/0188187 A1* | 8/2011 | Barnett et al. ........... 361/679.01 |

FOREIGN PATENT DOCUMENTS

| | | |
|---|---|---|
| JP | H09-305262 A | 11/1997 |
| JP | H11-024788 A | 1/1999 |
| JP | 3222764 B2 | 10/2001 |
| JP | 2005-092864 A | 4/2005 |
| JP | 2005-108201 A | 4/2005 |
| JP | 2005-175777 A | 6/2005 |
| JP | 2006-270836 A | 10/2006 |
| JP | 2009-071588 A | 9/2007 |
| JP | 2007-004212 A | 11/2007 |
| JP | 2007-534242 A | 11/2007 |
| JP | 2009-060292 A | 3/2009 |
| JP | 2009-089377 A | 4/2009 |
| JP | 2009-104242 A | 5/2009 |
| KR | 10-2005-0081289 A | 8/2005 |
| KR | 10-2004-0057314 A | 6/2008 |
| WO | 2005/020046 A1 | 3/2005 |

OTHER PUBLICATIONS

Notification of Reasons for Rejection dated Apr. 3, 2012, issued in counterpart Japanese Application No. 2009-222556.
Notification of Reasons for Rejection dated Jul. 9, 2012, issued in counterpart Japanese Application No. 2009-222557.
Notification of Reasons for Rejection dated Jul. 9, 2012, issued in counterpart Japanese Application No. 2009-222559.
Notice of grounds for rejection dated Jun. 26, 2013, issued in counterpart Korean application No. KR10-2012-7007841.
Office Action dated Jan. 22, 2014, issued in counterpart Korean application No. KR10-2012-7007841.

* cited by examiner

F I G. 10
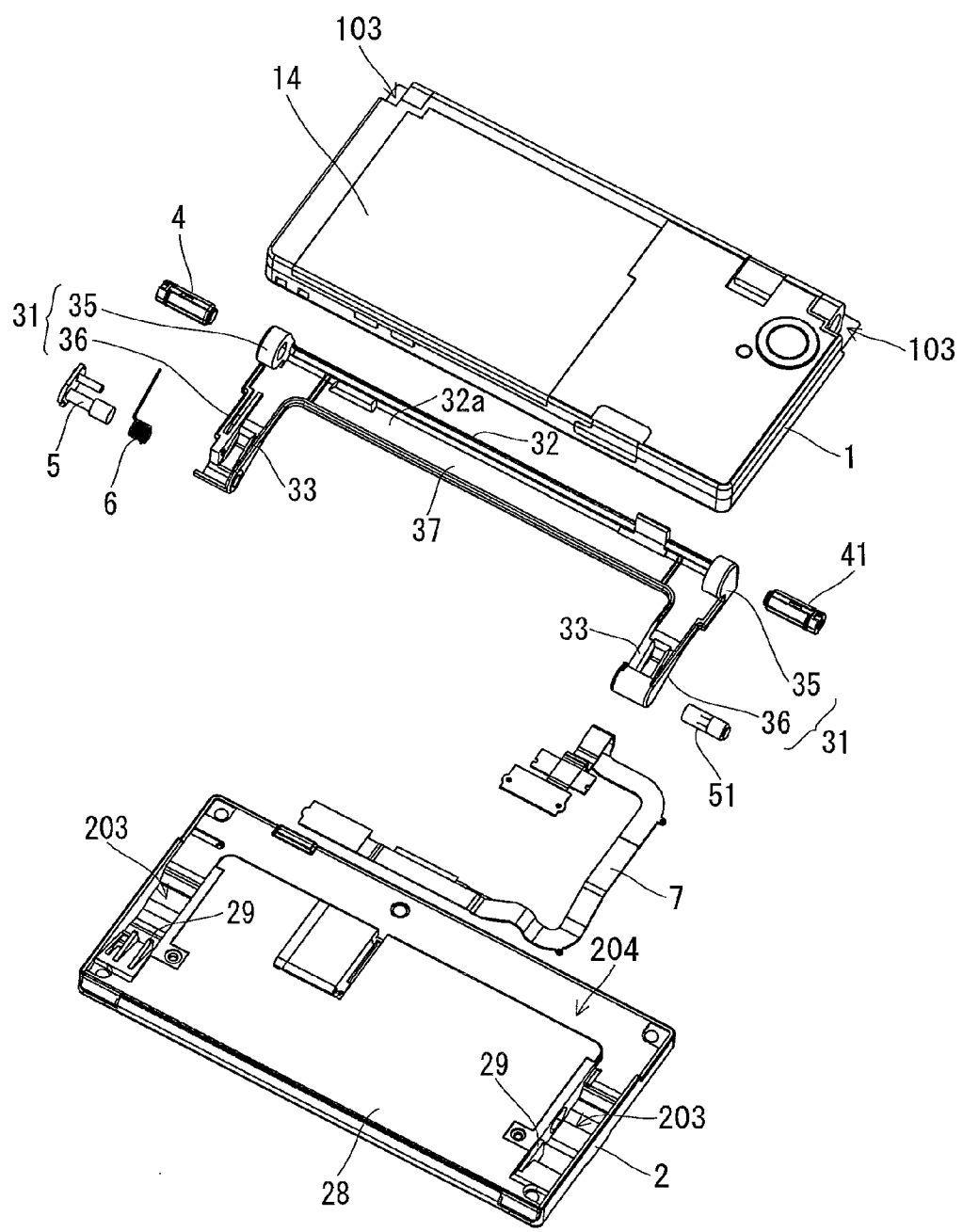

F I G. 1 3
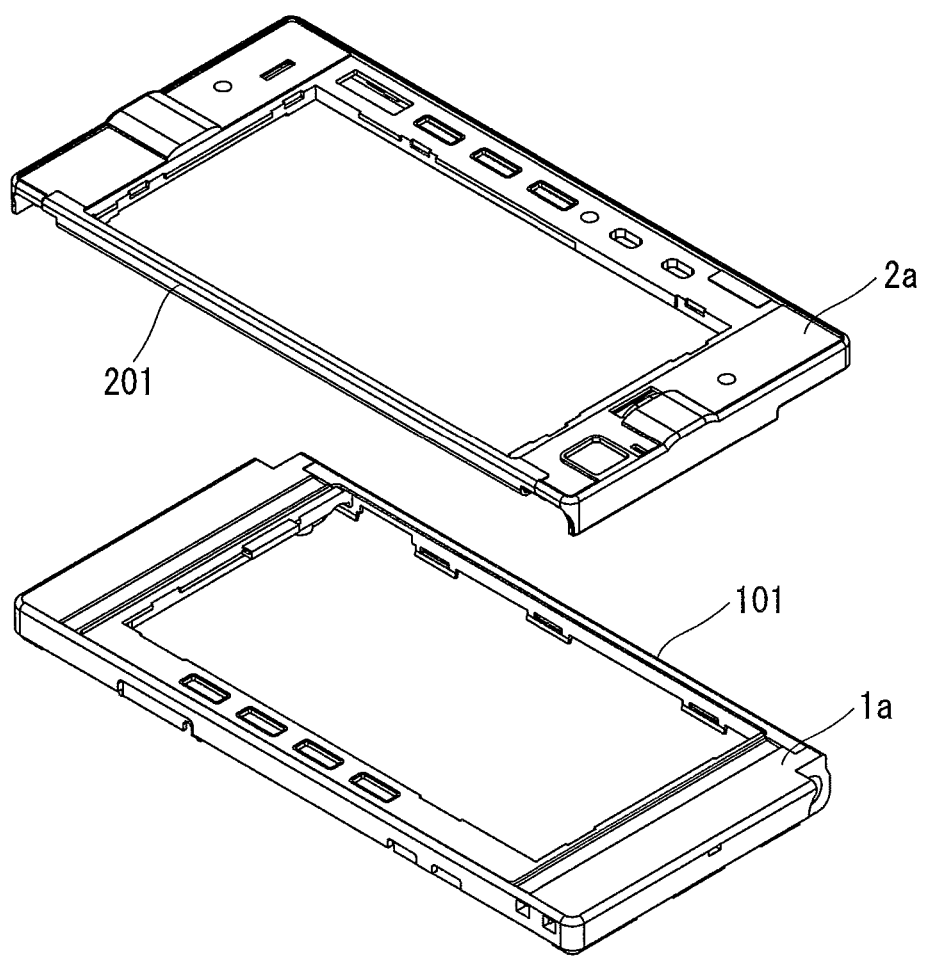

A-A cross-section

B-B cross-section

F I G. 2 3
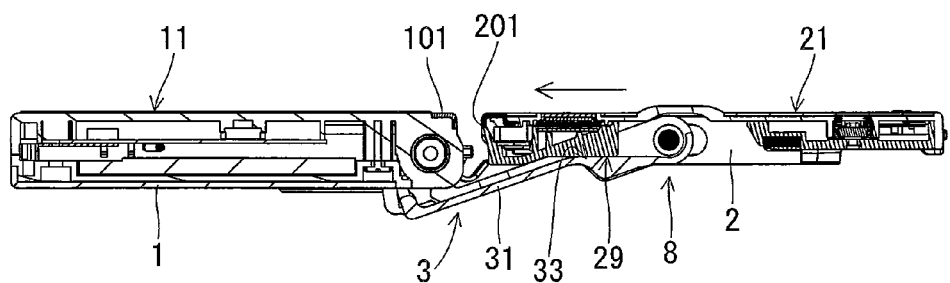
(a)
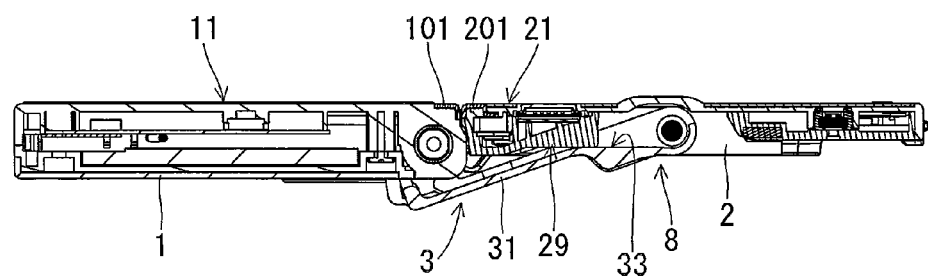
(b)

F I G. 2 4
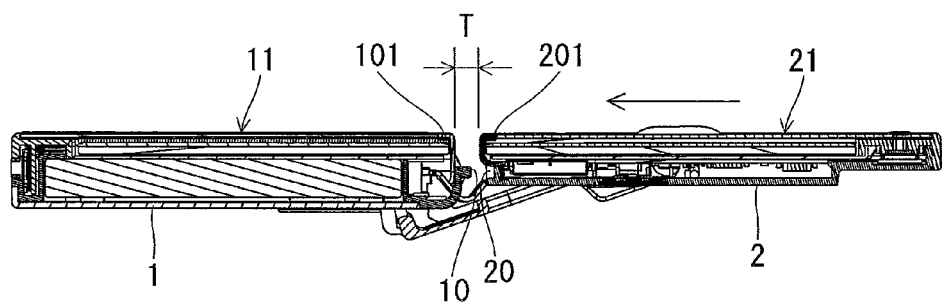
(a)
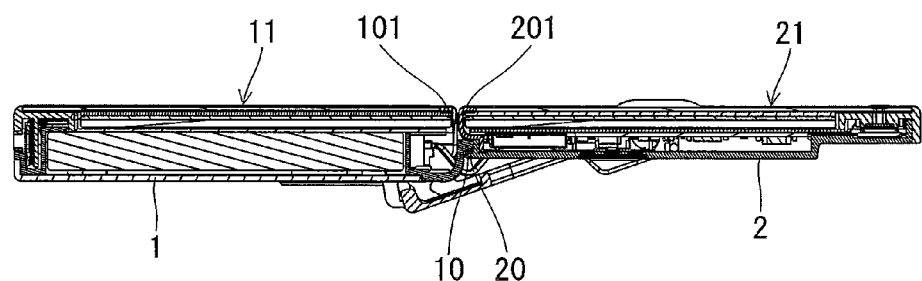
(b)

FIG. 25
(a) 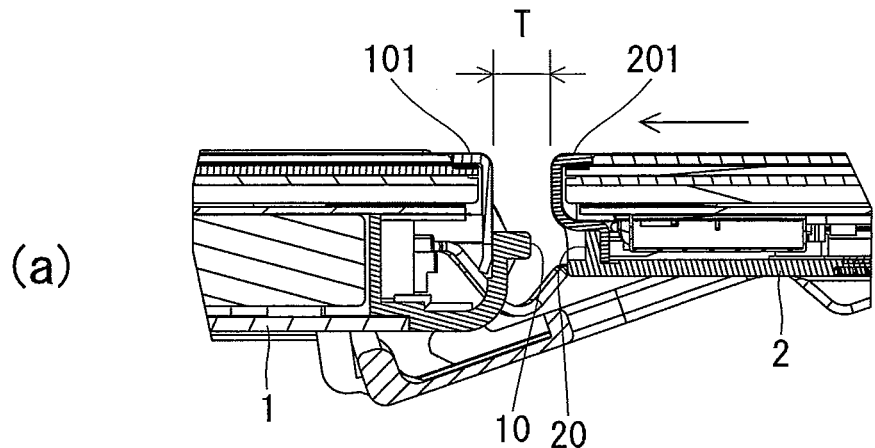
(b) 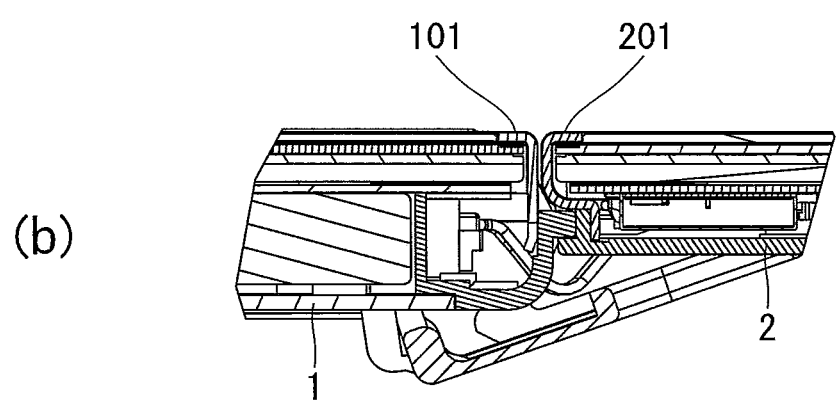

FIG. 27
(a) 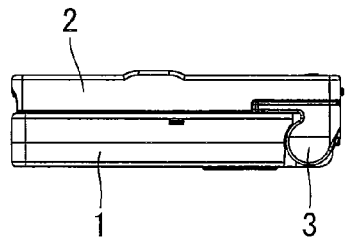
(b) 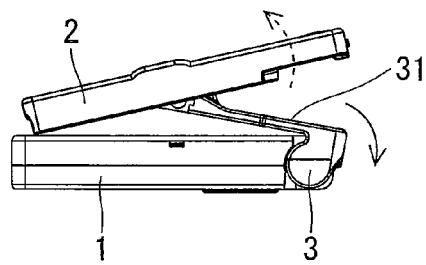
(c) 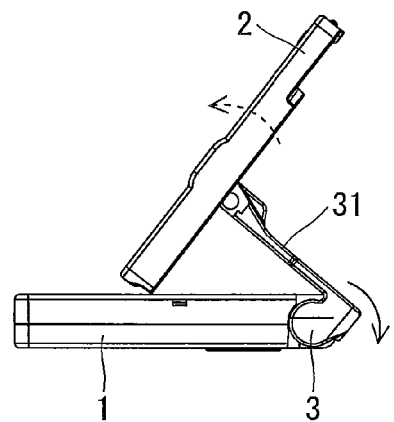
(d) 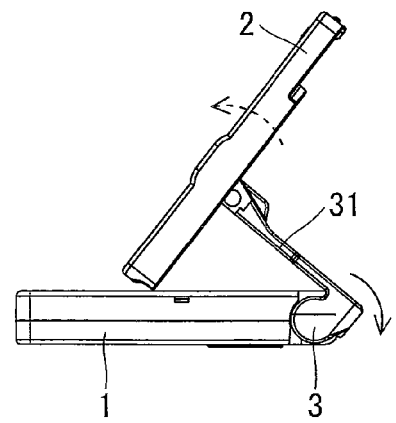

FIG. 28
(a) 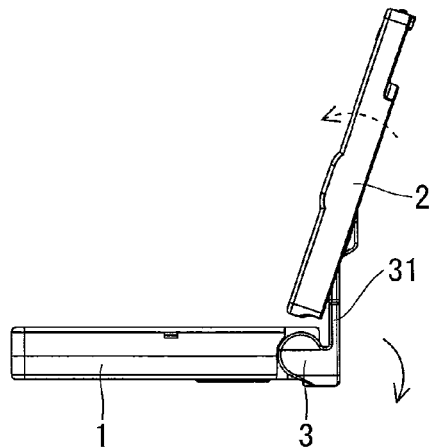
(b) 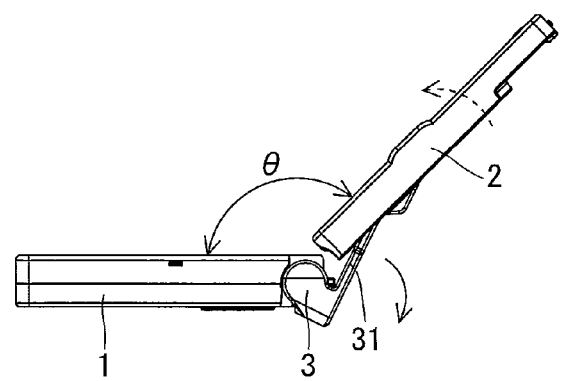
(c) 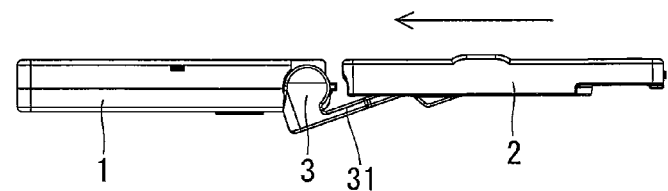
(d) 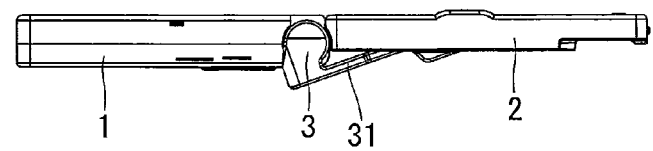

FIG. 29
(a)
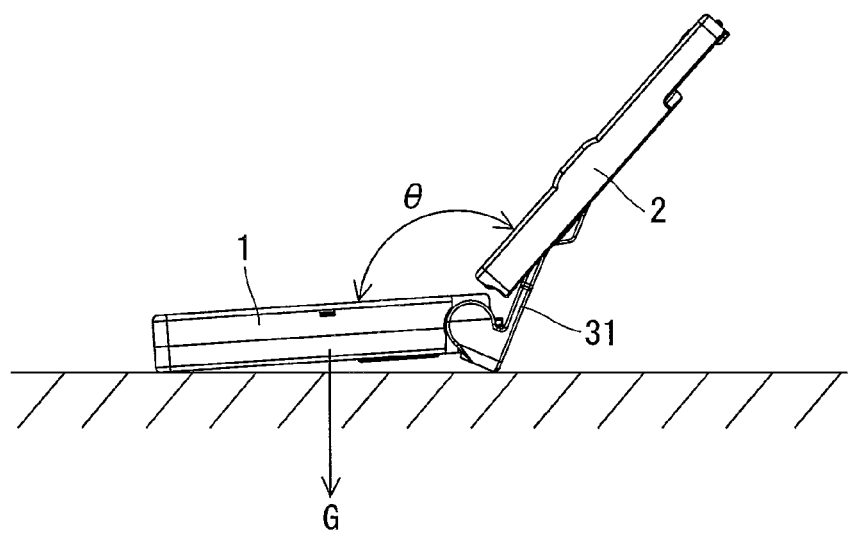
(b)
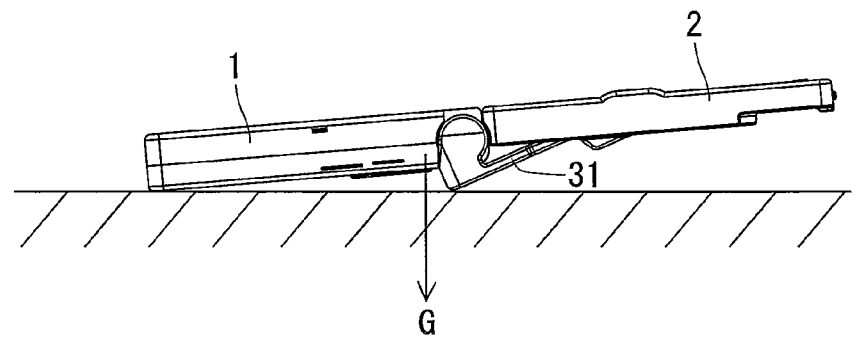

PORTABLE ELECTRONIC APPARATUS

TECHNICAL FIELD

The present invention relates to portable electronic apparatuses constituted by a pair of casings coupled to each other.

BACKGROUND ART

Conventionally, there have been known portable electronic apparatuses constituted by a pair of casings coupled to each other, such that both the casings are provided with respective image display surfaces, thereby enabling both the image display surfaces to offer larger amounts of information to users (refer to Patent Documents 1 and 2).

Such portable electronic apparatuses are adapted, for example, to allow both the casings to move with respect to each other, between a single-surface exposed state (a full-closed state) where the pair of casings are overlaid on each other, a lower casing (a first casing) is covered at its image display surface (a first image display surface) with an upper casing (a second casing), and only an image display surface (a second image display surface) in the second casing is exposed, and a double-surface exposed state where the second casing has been moved with respect to the first casing, and the image display surfaces of both the casings are exposed.

In the double-surface exposed state, the second casing has been brought into a tilt state where the second image display surface is inclined with respect to the first image display surface at an angle of opening which is equal to or more than 90 degrees but less than 180 degrees (refer to Patent Document 1) or into a full-open state where the second image display surface is flushed with the first image display surface in the same plane (refer to Patent Document 2).

PRIOR ART DOCUMENT

Patent Document

[Patent Document 1] Publication of Japanese Patent No. 3222764
[Patent Document 2] JP-A No. 2009-71588

SUMMARY OF INVENTION

Problems to be Solved by the Invention

However, in such conventional portable electronic apparatuses including a first casing and a second casing which are coupled to each other through a linkage mechanism, in the double-surface exposed state, the second casing can be merely brought into any one of a tilt state and a full-open state, and it has been impossible to selectively set both the tilt state and the full-open state.

Further, in the full-closed state, the linkage mechanism is largely protruded from the opposite sides of both the casings, which has induced the problem of an increase of the lateral width of the apparatus. Further, in the full-open state, the linkage mechanism can be largely viewed from a user, which has induced a drawback in terms of an external appearance.

Furthermore, there is a need for defining a locus of movements of the second casing with respect to the first casing, in such a way as to prevent both the casings from interfering with each other during processing for transitions from the full-closed state to the full-open state. Such a movement locus has been realized through operations of the linkage mechanism, which has induced a large gap between the first casing and the second casing in the full-open state. Thus, in cases of displaying images on a large screen using the two image display surfaces, there has been induced the problem of the occurrence of a large discontinuity in a single image between the two image display surfaces.

Accordingly, it is a first object of the present invention to provide a portable electronic apparatus including a first casing and a second casing which are coupled to each other through a coupling mechanism and, further, being capable of being selectively set in three states which are a full-closed state where both the casings are overlaid on each other and only an image display surface in the second casing is exposed, a tilt state where the second casing is inclined with respect to the first casing at an angle of opening which is equal to or more than 90 degrees but less than 180 degrees, and a full-open state where the image display surfaces in both the casings are flushed with each other in the same plane.

Further, it is a second object of the present invention to provide a portable electronic apparatus including a first casing and a second casing which are coupled to each other through a coupling mechanism and, further, being adapted to prevent the coupling mechanism from largely protruding from the opposite sides of both the casings in the full-closed state and furthermore to prevent the coupling mechanism from being largely viewed from a user in the full-open state.

Further, it is a third object of the present invention to provide a portable electronic apparatus capable of preferably displaying images using the two image display surfaces as a single screen, in the full-open state where the image display surfaces in both the casings are flushed with each other in the same plane.

Means for Solving the Problems

A first portable electronic apparatus according to the present invention includes a first casing and a second casing which are coupled to each other, in which both the casings are provided with respective image display surfaces in their surfaces.

In this case, the first casing and the second casing are coupled to each other such that they can move with respect to each other, among a full-closed state where the image display surface in the first casing is covered with a rear surface of the second casing and, also, the image display surface in the second casing is exposed, a tilt state where the second casing has been moved from the full-closed state so that the image display surfaces in both the casings are exposed and, also, the image display surface in the second casing is inclined with respect to the image display surface in the first casing at an angle of opening which is equal to or more than 90 degrees but less than 180 degrees, and a full-open state where the second casing has been moved from the tilt state so that the image display surfaces in both the casings are exposed in the same plane.

Further, the portable electronic apparatus according to the present invention includes state transition means which causes transitions among the full-closed state, the tilt state and the full-open state, and the state transition means is adapted to softly lock the second casing, in attitude, with respect to the first casing in the tilt state and also is adapted to cause the second casing to engage, at an end portion thereof, with an end portion of the first casing such that they can be engaged with and disengaged from each other in the full-open state.

More specifically, the first portable electronic apparatus according to the present invention includes:

a coupling arm which is coupled, at its base end portion, to the first casing through a first pivot shaft and also is coupled, at its tip end portion, to the second casing through a second pivot shaft parallel to the first pivot shaft, the coupling arm being adapted to couple both the casings such that they can move with respect to each other, among a full-closed state where the image display surface in the first casing is covered with a rear surface of the second casing and, also, the image display surface in the second casing is exposed, a tilt state where the second casing has been moved from the full-closed state so that the image display surfaces in both the casings are exposed and, also, the image display surface in the second casing is inclined with respect to the image display surface in the first casing at an angle of opening which is equal to or more than 90 degrees but less than 180 degrees, and a full-open state where the second casing has been moved from the tilt state so that the image display surfaces in both the casings are exposed in the same plane;

biasing means which rotationally biases the second casing in a single direction with respect to the coupling arm, about the second pivot shaft;

receiving means which is provided on the coupling arm and is adapted to receive the second casing at an inclination angle of the tilt state, against the rotational biasing by the biasing means;

soft locking means adapted to, when the coupling arm has rotated to a rotational angle of the tilt state about the first pivot shaft, softly lock the coupling arm at this rotational angle; and engagement means which causes the second casing to engage, at an end portion thereof, with an end portion of the first casing, such that they can be engaged with and disengaged from each other, in a state where the coupling arm has rotated to a rotational angle of the full-open state about the first pivot shaft and, thus, the image display surfaces in both the casings are flushed with each other in the same plane.

With the first portable electronic apparatus according to the present invention, in the full-closed state, the biasing means exerts rotational biasing force on the second casing, but the rear surface of the second casing comes into contact with the surface of the first casing over their surface areas, so that the rotational biasing force is received thereby, which maintains the second casing at a stabilized attitude on the first casing.

In the tilt state, the coupling arm is softly locked by the soft locking means and is held at the rotational angle of the tilt state. Further, in this state, the rotational biasing force exerted on the second casing by the biasing means is received by the receiving means on the coupling arm. As a result thereof, the second casing is maintained at a stabilized attitude on the first casing.

In the full-open state, in a state where the rotational biasing force exerted on the second casing by the biasing means is received by the receiving means in the coupling arm, the second casing is engaged, at an end portion thereof, with an end portion of the first casing, such that they can be engaged with and disengaged from each other. Accordingly, the second casing is maintained at a stabilized attitude with respect to the first casing.

In a detailed aspect, the coupling arm is provided on each of left and right end portions of the first casing and the second casing, and each coupling arm is coupled, at its base end portion, to a side portion of the first casing through the first pivot shaft and, also, is coupled, at its tip end portion, to a rear portion of the second casing through the second pivot shaft.

Accordingly, when both the casings are in the full-closed state, the pair of left and right coupling arms are positioned in rear portions of the second casing and, therefore, both the coupling arms are hidden from the user's line of sight.

In another detailed aspect, the biasing means is adapted to rotationally bias the second casing in such a direction as to reduce the angle of opening of the image display surface in the second casing, in the tilt state.

Accordingly, during processing for transitions from the full-closed state to the tilt state, due to the rotational biasing, the second casing experiences force in such a direction that the second casing is raised, which facilitates user's operations for transitions from the full-closed state to the tilt state.

In yet another detailed aspect, the receiving means is constituted by a receiving surface which is formed between the base end portion and the tip end portion of the coupling arm and is to come into contact with a portion of the rear surface of the second casing in the tilt state.

Accordingly, during processing for transitions from the tilt state to the full-open state, the second casing is moved with a stabilized attitude, while the rear surface of the second casing is received by the receiving surface in the coupling arm.

In yet another detailed aspect, the soft locking means is constituted by a hinge unit adapted to bias the coupling arm, with respect to the first casing, toward the rotational angle of the tilt state, within a certain angle range centered at the rotational angle of the tilt state.

Accordingly, during processing for shifting the second casing from the full-closed state to the tilt state, when the coupling arm enters the certain angle range, the coupling arm is biased toward the rotational angle of the tilt state and, along therewith, the second casing is biased toward the tilt state and, accordingly, if the second casing is slightly pushed rearwardly in the full-closed state, in combination with the biasing by the biasing means, the second casing, thereafter, is automatically moved to the tilt state.

Further, a second portable electronic apparatus according to the present invention includes a first casing and a second casing which are coupled to each other through a coupling mechanism, wherein both the casings are provided with respective image display surfaces in their surfaces, and the portable electronic apparatus is capable of being selectively set in at least two states which are a full-closed state where the image display surface in the first casing is covered with a rear surface of the second casing and, also, the image display surface in the second casing is exposed, and a full-open state where the second casing has been moved from the full-closed state so that the image display surfaces in both the casings are exposed in the same plane.

In this case, the coupling mechanism includes a coupling arm which couples the first casing and the second casing to each other such that they can move with respect to each other between the full-closed state and the full-open state, and one or both of the casings is provided with a housing portion with a concave shape to house the coupling arm in the full-closed state.

More specifically, the coupling mechanism includes a pair of coupling arms provided on both the casings at their opposite end portions in leftward and rightward directions which are orthogonal to the direction of the coupling between both the casings, each coupling arm has an L shape which is bent in an L form in a plane intersecting with the image display surfaces in both the casings and, further, each coupling arm includes a first arm portion and a second arm portion intersecting with each other at the angular portion of the L shape, such that the first arm portion is coupled, at an end portion thereof, to the first casing through a first pivot shaft, and the second arm portion is coupled, at an end portion thereof, to the second casing through a second pivot shaft parallel to the first pivot shaft.

Further, the first casing is provided, at rear end portions of its opposite side surfaces, with housing portions with concave shapes to house the first arm portions of the pair of coupling arms in the full-closed state, and the second casing is provided, at opposite side portions of its rear surface, with housing portions with concave shapes to house the second arm portions of the pair of coupling arms in the full-closed state.

With the second portable electronic apparatus according to the present invention, the first arm portions of the pair of coupling arms are housed in the housing portions in the first casing and, also, the second arm portions of the pair of coupling arms are housed in the housing portions in the second casing, in the full-closed state. During transitions from the full-closed state to the full-open state, the first arm portions and the second arm portions of the coupling arms are disengaged from the respective housing portions and, further, the coupling arms are rotated.

Further, in the full-open state, the pair of coupling arms are hidden substantially in its entirety, behind the rear surfaces of both the casings.

Further, a third portable electronic apparatus according to the present invention includes a first casing and a second casing which are coupled to each other through a coupling mechanism, wherein both the casings being provided with respective image display surfaces in their surfaces, and the portable electronic apparatus is capable of being selectively set in at least two states which are a full-closed state where the image display surface in the first casing is covered with a rear surface of the second casing and, also, the image display surface in the second casing is exposed, and a full-open state where the second casing has been moved from the full-closed state so that the image display surfaces in both the casings are exposed in the same plane. Further, the portable electronic apparatus includes a sliding mechanism for sliding the second casing toward the first casing in the full-open state where the image display surfaces in both the casings are exposed in the same plane.

For example, the sliding mechanism is interposed between the coupling mechanism and the second casing.

With the third portable electronic apparatus according to the present invention, after a transition from the full-closed state to the full-open state where the image display surfaces in the first casing and the second casing are flushed with each other in the same plane, by pulling the second casing toward the first casing, it is possible to reduce the interval between the first image display surface and the second image display surface. Thus, in cases of displaying images using the two image display surfaces as a single screen, it is possible to prevent occurrences of large discontinuities in images displayed on both the image display surfaces.

In a detailed aspect, the coupling mechanism includes a coupling arm which is coupled, at its base end portion, to the first casing through a first pivot shaft and, also, is coupled, at its tip end portion, to the second casing through a second pivot shaft parallel with the first pivot shaft, the coupling arm can rotate between a rotational angle of the full-closed state and a rotational angle of the full-open state, the sliding mechanism includes a sliding member which is slidably provided in the second casing, the coupling arm is pivotally supported at its tip end portion by the sliding member, the coupling arm and the second casing are provided with a receiving surface and a sliding surface, respectively, which are to slidably come into contact with each other in the full-open state, and the sliding surface in the second casing slides on the receiving surface in the coupling arm during processing for sliding the sliding member.

In this detailed aspect, the second casing (2) can be maintained at a stabilized attitude, during processing for sliding the second casing (2) in the full-open state.

In another detailed aspect, out of cabinet walls forming the first casing and the second casing, two end surface walls which are to get closer to or separate from each other along with sliding through the sliding mechanism in the full-open state are formed from metal plates.

In the detailed aspect, when both the casings are got closer to each other in the full-open state, both the metal plates are faced to each other. Accordingly, in comparison with a common structure which causes cabinets made of a synthetic resin to face each other without employing such metal plates, it is possible to reduce the interval between the first image display surface and the second image display surface, by the difference between the thickness of the metal plates and the thickness of such cabinets made of a synthetic resin.

Effects of the Invention

The first portable electronic apparatus according to the present invention is capable of being selectively set in three states which are a full-closed state where the first casing and the second casing are overlaid on each other and only the image display surface in the second casing is exposed, a tilt state where the second casing is inclined with respect to the first casing at an angle of opening which is equal to or more than 90 degrees but less than 180 degrees, and a full-open state where the image display surfaces in both the casings are flushed with each other in the same plane.

Further, with the second portable electronic apparatus according to the present invention, it is possible to prevent the coupling mechanism from largely protruding from the opposite sides of both the casings in the full-open state where the image display surface in the first casing and the image display surface in the second casing are flushed with each other in the same plane and, furthermore, it is possible to prevent the coupling mechanism from being largely viewed from a user in the full-open state.

Further, with the third portable electronic apparatus according to the present invention, in the full-open state where the image display surfaces in the first casing and the second casing are flushed with each other in the same plane, in cases of displaying images using the two image display surfaces as a single screen, it is possible to preferably display images with substantially no discontinuities.

BRIEF DESCRIPTION OF DRAWINGS

FIG. 10 is an exploded perspective view illustrating the portable electronic apparatus with being reversed.

FIG. 13 is a perspective view of a front-surface cabinet forming a first casing and a front-surface cabinet forming a second casing.

FIG. 23 is cross-sectional views illustrating the portable electronic apparatus, illustrating a transition from the rotational full-open state (a) to the sliding full-open state (b).

FIG. 24 is another cross-sectional views illustrating the portable electronic apparatus, illustrating a transition from the rotational full-open state (a) to the sliding full-open state (b).

FIG. 25 is an enlarged cross-sectional view illustrating main portions in FIG. 24.

FIG. 27 is a series of side views illustrating the first half of processing for transitions of the portable electronic apparatus according to the present invention from the full-closed state to the sliding full-open state through the tilt state.

FIG. 28 is a series of side views illustrating the second half of the same processing.

FIG. 29 is side views illustrating the portable electronic apparatus according to the present invention being placed on a desk, in the tilt state (a) and in the sliding full-open state (b).

DETAILED DESCRIPTION OF EMBODIMENTS

Figure 1:
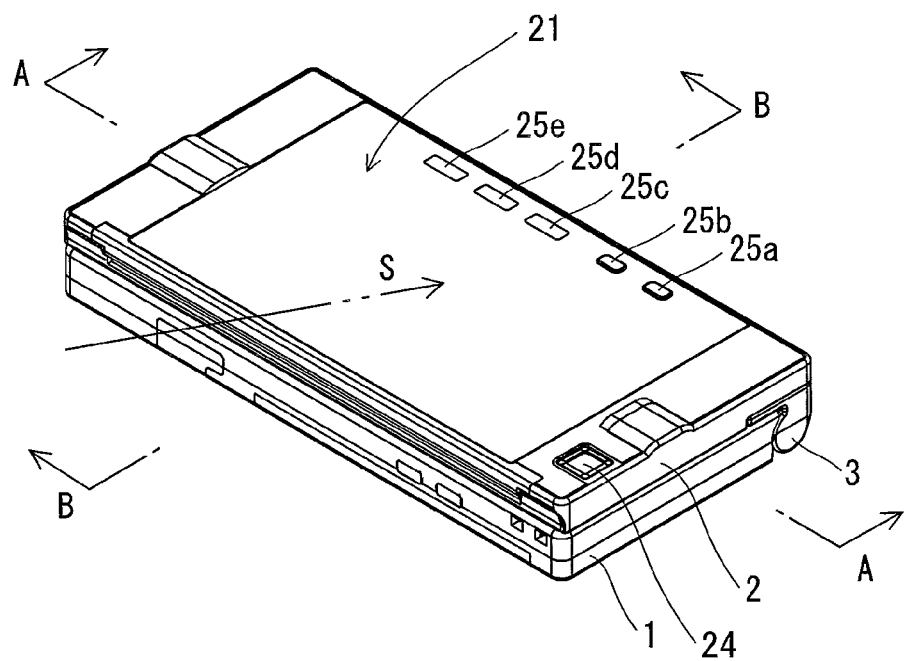
FIG. 1 is a perspective view illustrating a portable electronic apparatus according to the present invention, in a full-closed state.

Hereinafter, an embodiment of the present invention will be described, in detail, with reference to the drawings.

A portable electronic apparatus according to an embodiment of the present invention includes a first casing (1) having a first image display surface (11) in its surface, a second casing (2) having a second image display surface (21) in its surface, and a coupling mechanism (3) which couples the first casing (1) and the second casing (2) to each other, as illustrated in FIGS. 1 to 8.

Further, for identifying respective portions of the components of the portable electronic apparatus in the following description, "front (the side closer to the person viewing the figures)", "rear", "left" and "right" regarding the portable electronic apparatus illustrated in FIG. 1 when viewed along a user's line of sight indicated by an arrow S in the figure will be also referred to as "front", "rear", "left" and "right", regardless of the attitude of the portable electronic apparatus in the other drawings.

As illustrated in FIG. 1, the second casing (2) is provided, at a right side portion and a rear end portion of its surface, with a cursor key (24) for moving a cursor, an END key (25a) for performing on-hook operations, a TALK key (25b) for performing off-hook operations, a home key (25c) for displaying a home screen, a menu key (25d) for displaying a menu screen, and a BACK key (25e) for turning back the operation by a single step. In this case, the END key (25a) and the TALK key (25b) are mechanical switches and are housed in concave portions formed in a front-surface cabinet. On the other hand, the home key (25c), the menu key (25d) and the BACK key (25e) are software-wise keys and are for operating, via through holes formed in the front-surface cabinet, a touch panel under these through holes.

Figure 2:
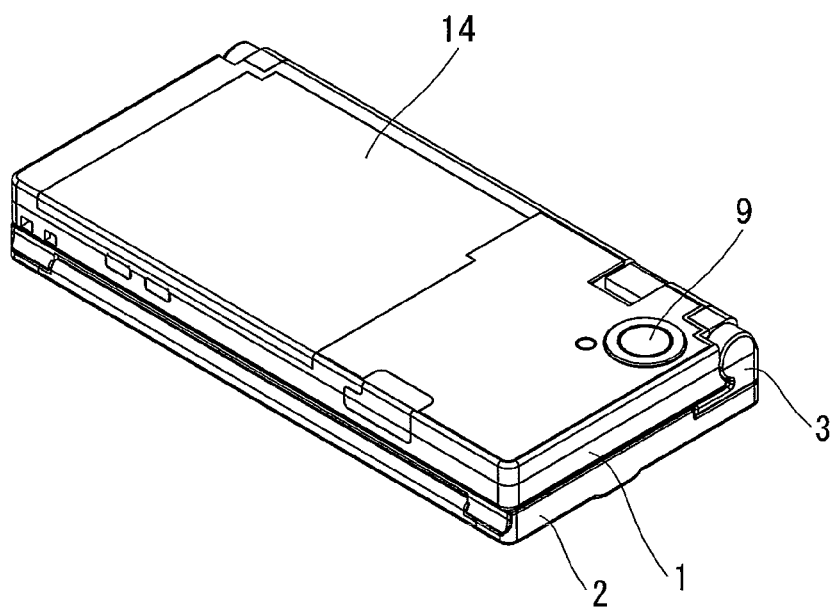
FIG. 2 is a perspective view illustrating the portable electronic apparatus in the full-closed state with being reversed.

Further, as in FIG. 2, a photographing lens (9) is provided in the rear surface of the first casing (1).

Figure 3:
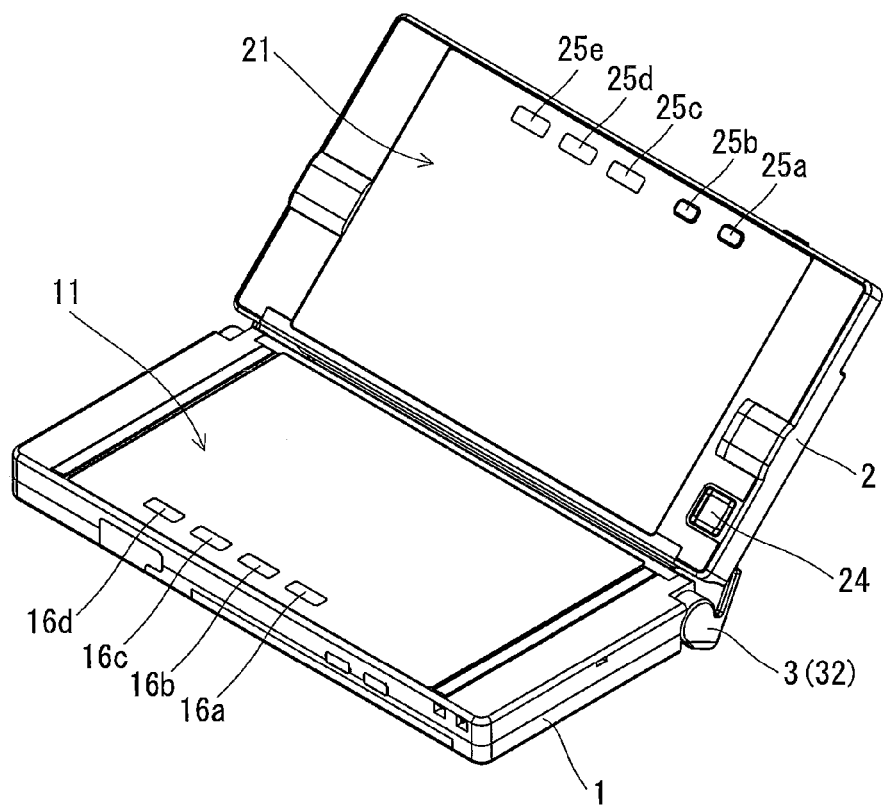
FIG. 3 is a perspective view illustrating the portable electronic apparatus in a tilt state.

As illustrated in FIG. 3, the first casing (1) is provided with four operation keys (16a) (16b) (16c) (16d), at a front end portion of its surface. These operation keys are software-wise keys and are for operating, via through holes formed in a front-surface cabinet, a touch panel under these through holes.

Figure 17:
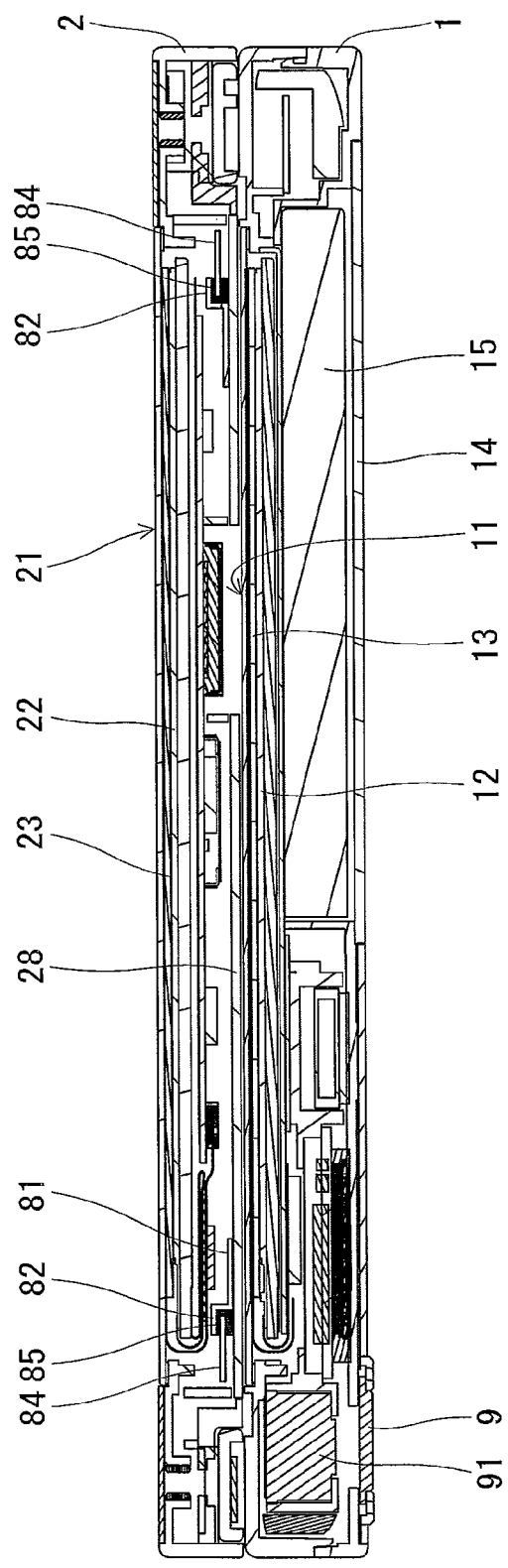
FIG. 17 is a cross-sectional view illustrating the portable electronic apparatus.
Figure 18:
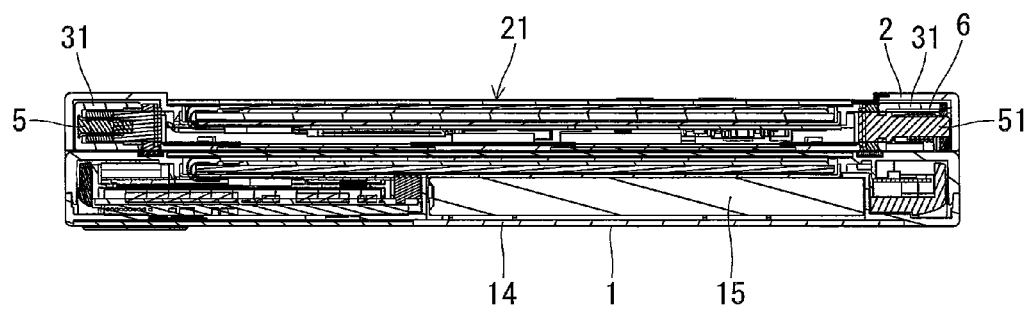
FIG. 18 is a cross-sectional view taken along the line A-A in FIG. 1.
Figure 19:
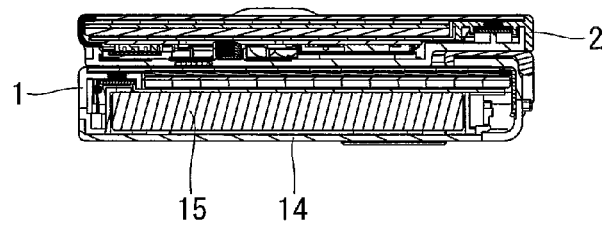
FIG. 19 is a cross-sectional view taken along the line B-B in FIG. 1.

As illustrated in FIG. 17, inside the first casing (1), there are placed a first touch panel (13) and a first display (12) such that they face the first image display surface (11), and, further, there is placed a camera (91) facing the photographing lens (9). Further, as illustrated in FIG. 18 and FIG. 19, the first casing (1) houses, therein, a battery (15), such that replacement of the battery (15) can be performed, by removing a battery lid (14).

On the other hand, inside the second casing (2), there are placed a second touch panel (23) and a second display (22), such that they face the second image display surface (21), as in FIG. 17.

Figure 14:
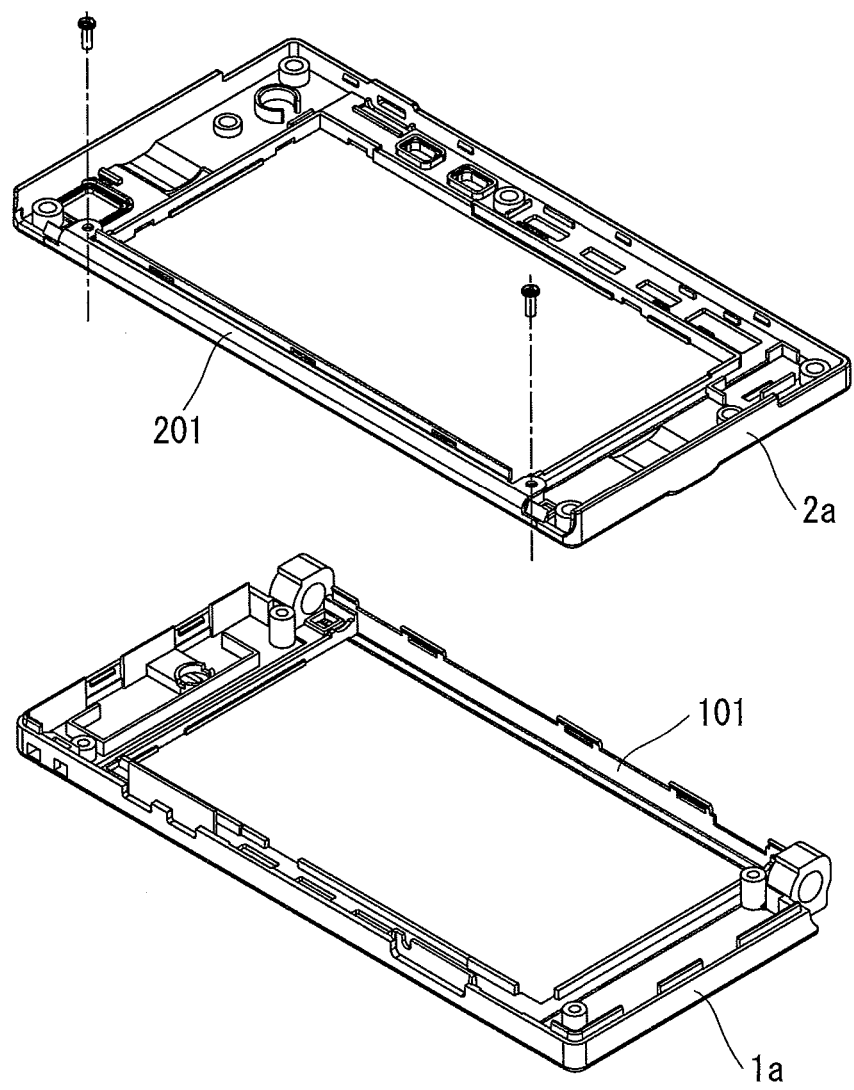
FIG. 14 is a perspective view illustrating the front-surface cabinet forming the first casing and the front-surface cabinet forming the second casing with being reversed.

As illustrated in FIG. 13 and FIG. 14, a metal plate (101) made of a stainless steel, which forms a portion of the front-surface cabinet (1a), is secured through screws to a rear end portion of the front-surface cabinet (1a) which forms the first casing (1), while a metal plate (201) made of a stainless steel, which forms a portion of the front-surface cabinet (2a), is secured through screws to a front end portion of the front-surface cabinet (2a) which forms the second casing (2). Also, the metal plates (101)(201) can be secured thereto through fitting structures.

Figure 26:
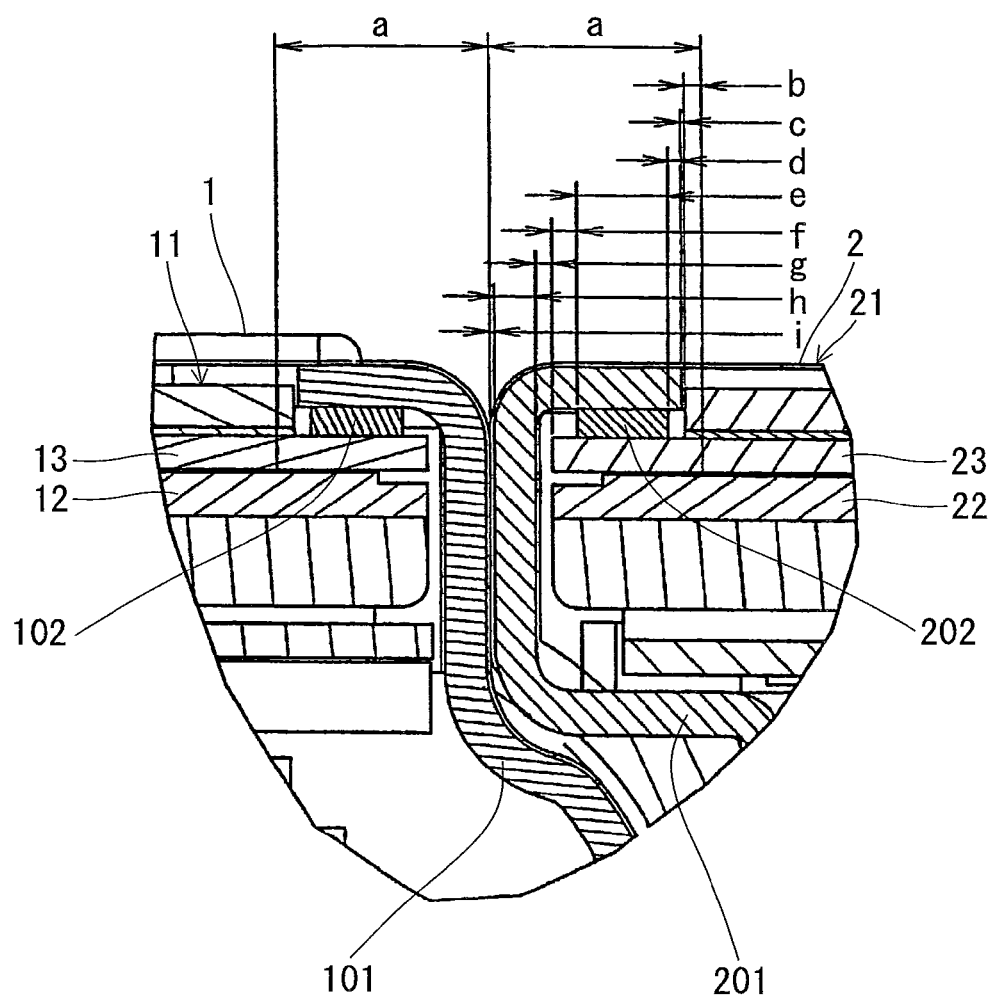
FIG. 26 is an enlarged cross-sectional view illustrating both the casings at their portions which come into contact with each other in the sliding full-open state.

As illustrated in FIG. 26, the metal plates (101)(201) are attached and secured, at end portions thereof, to end portions of the touch panels (13)(23), through double-faced attachment tapes (102)(202).

Figure 4:
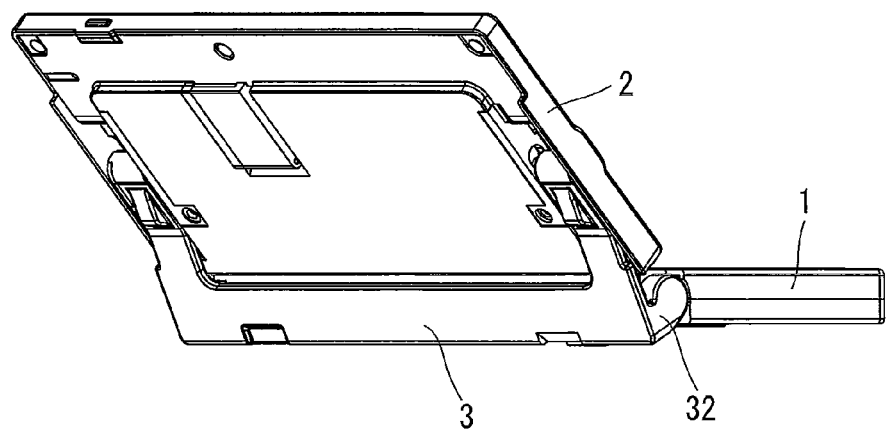
FIG. 4 is a perspective view illustrating the portable electronic apparatus, in the tilt state, when viewed at its rear side.
Figure 5:
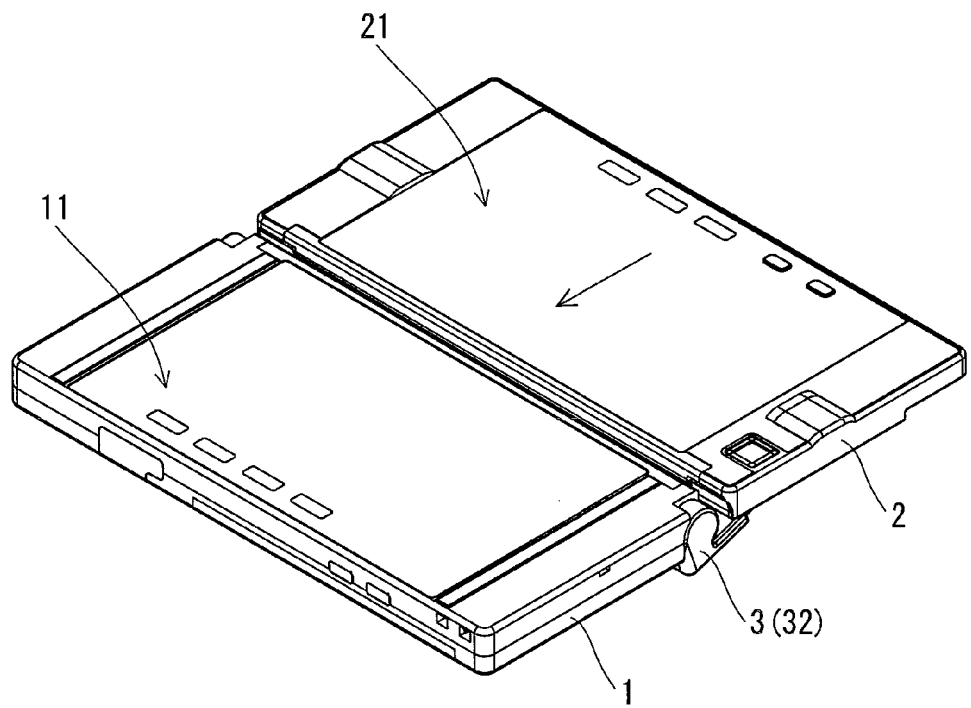
FIG. 5 is a perspective view illustrating the portable electronic apparatus, in a rotational full-open state.
Figure 6:
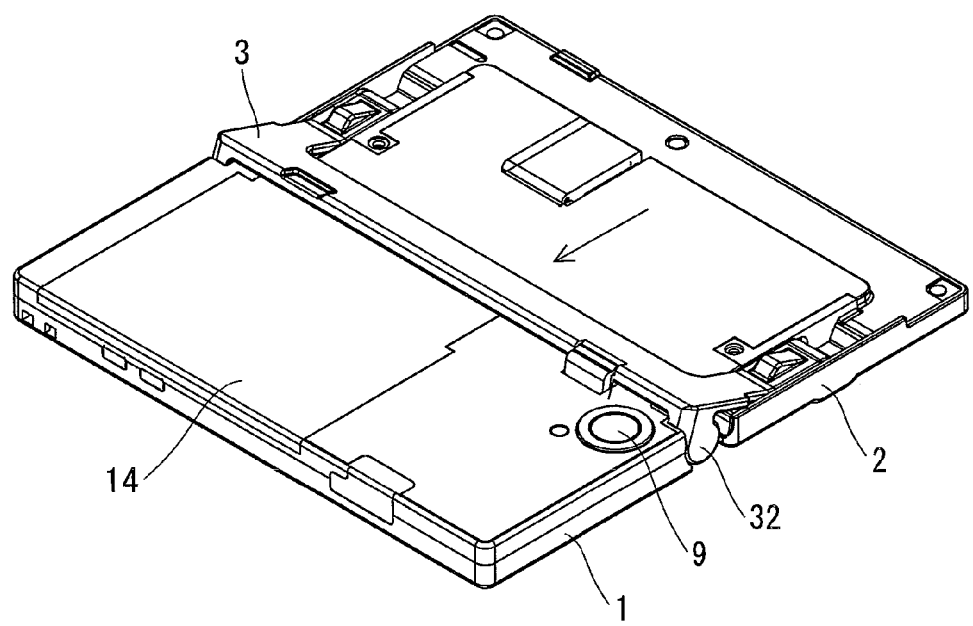
FIG. 6 is a perspective view illustrating the portable electronic apparatus in the rotational full-open state with being reversed.
Figure 7:
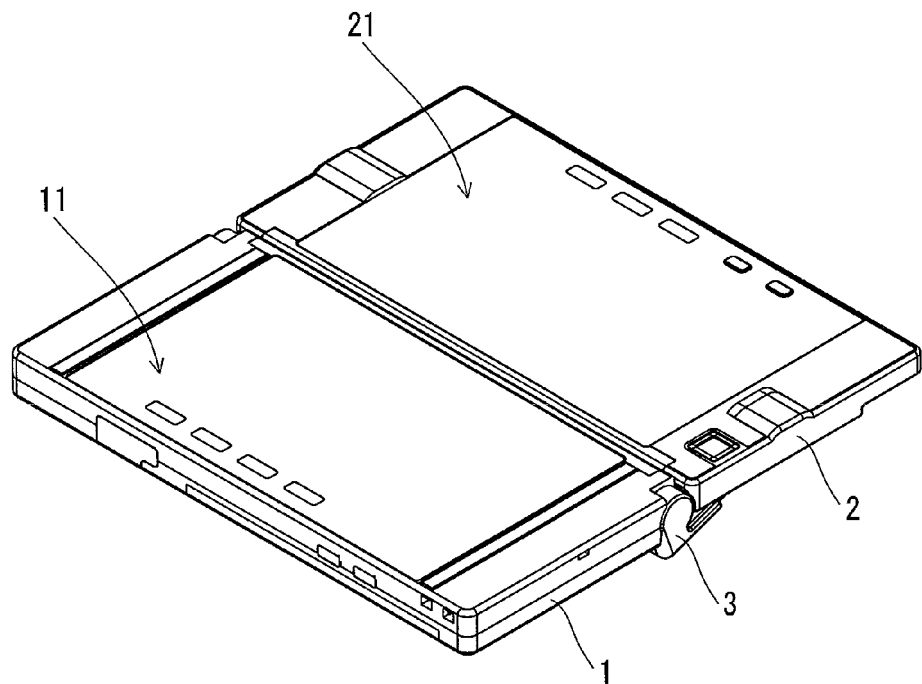
FIG. 7 is a perspective view illustrating the portable electronic apparatus in a sliding full-open state.
Figure 8:
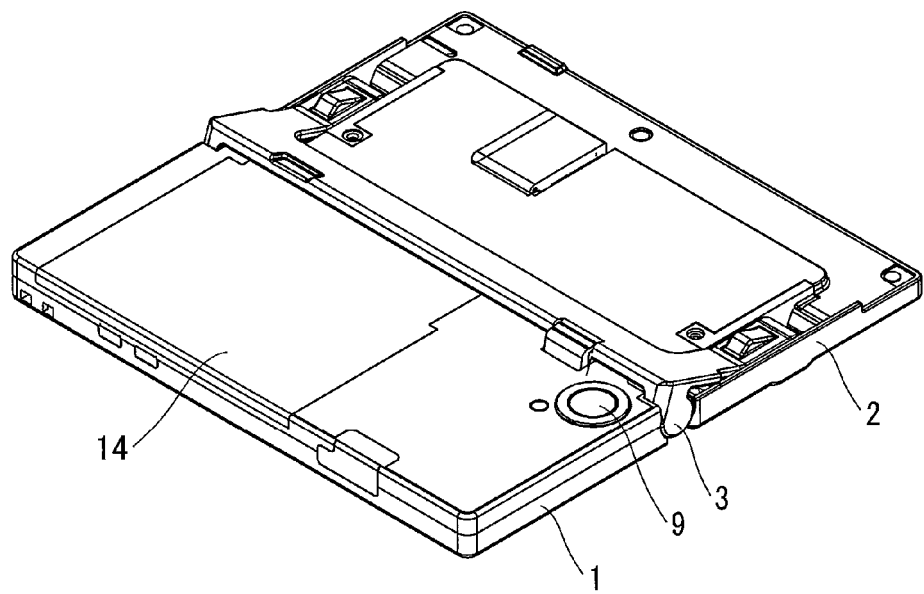
FIG. 8 is a perspective view illustrating the portable electronic apparatus in the sliding full-open state with being reversed.

The portable electronic apparatus according to the present invention is capable of being selectively set in four states as follows: a full-closed state where the first casing (1) is covered at its surface with the rear surface of the second casing (2) and, also, the surface of the second casing (2) is exposed as illustrated in FIG. 1 and FIG. 2; a tilt state where the second casing (2) has been rearwardly moved so that the surfaces of the both the casings (1) (2) are exposed and, also, the surface of the second casing (2) is inclined with respect to the surface of the first casing (1) at an angle of opening which is equal to or more than 90 degrees but less than 180 degrees as illustrated in FIG. 3 and FIG. 4; a rotational full-open state where the second casing (2) has been rearwardly rotated so that the surfaces of both the casings (1)(2) are exposed in the same plane as illustrated in FIG. 5 and FIG. 6; and a sliding full-open state where the second casing (2) has been slid toward the first casing (1) in a state where the surfaces of both the casings (1)(2) are exposed in the same plane as illustrated in FIG. 7 and FIG. 8.

Figure 9:
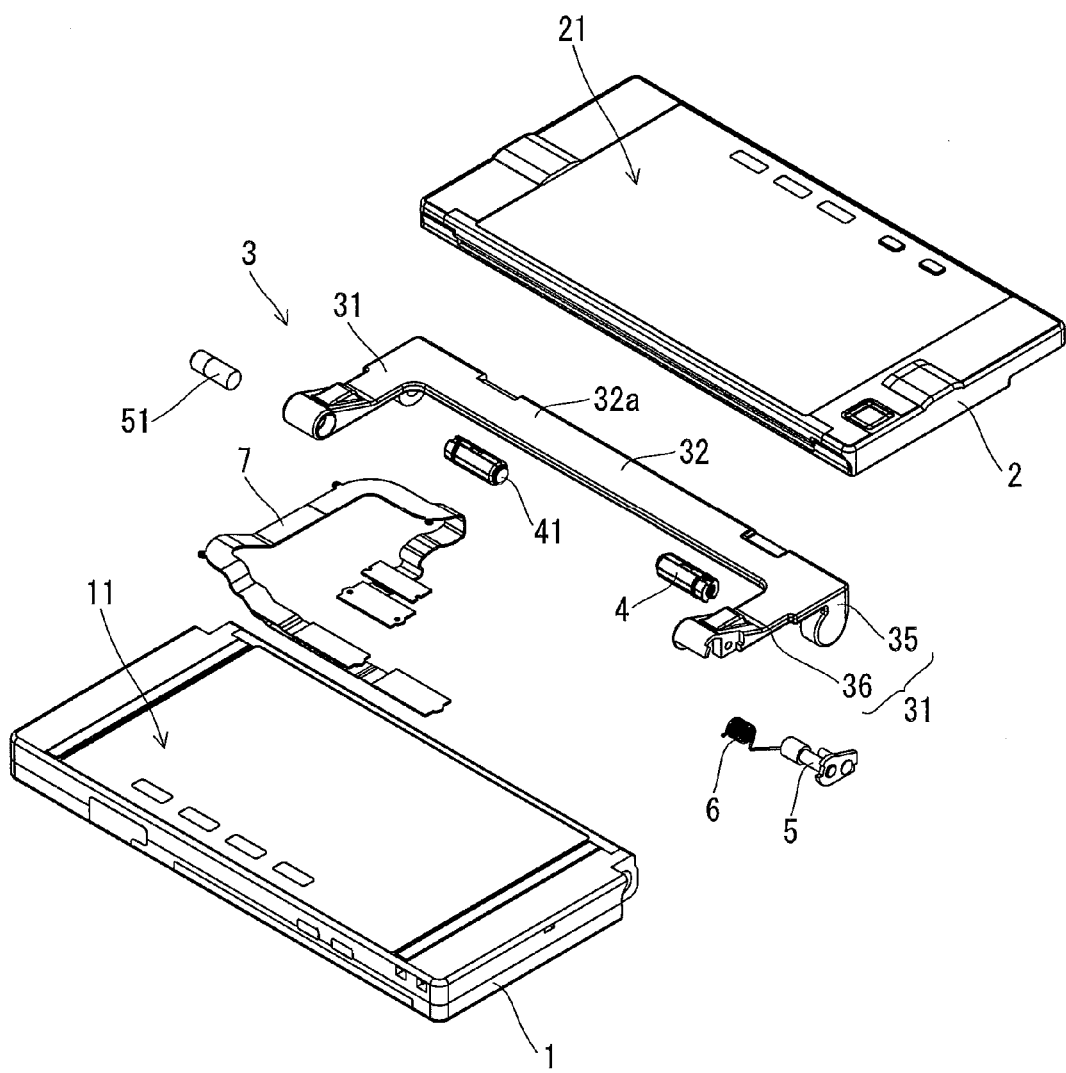
FIG. 9 is an exploded perspective view illustrating the portable electronic apparatus.
Figure 11:
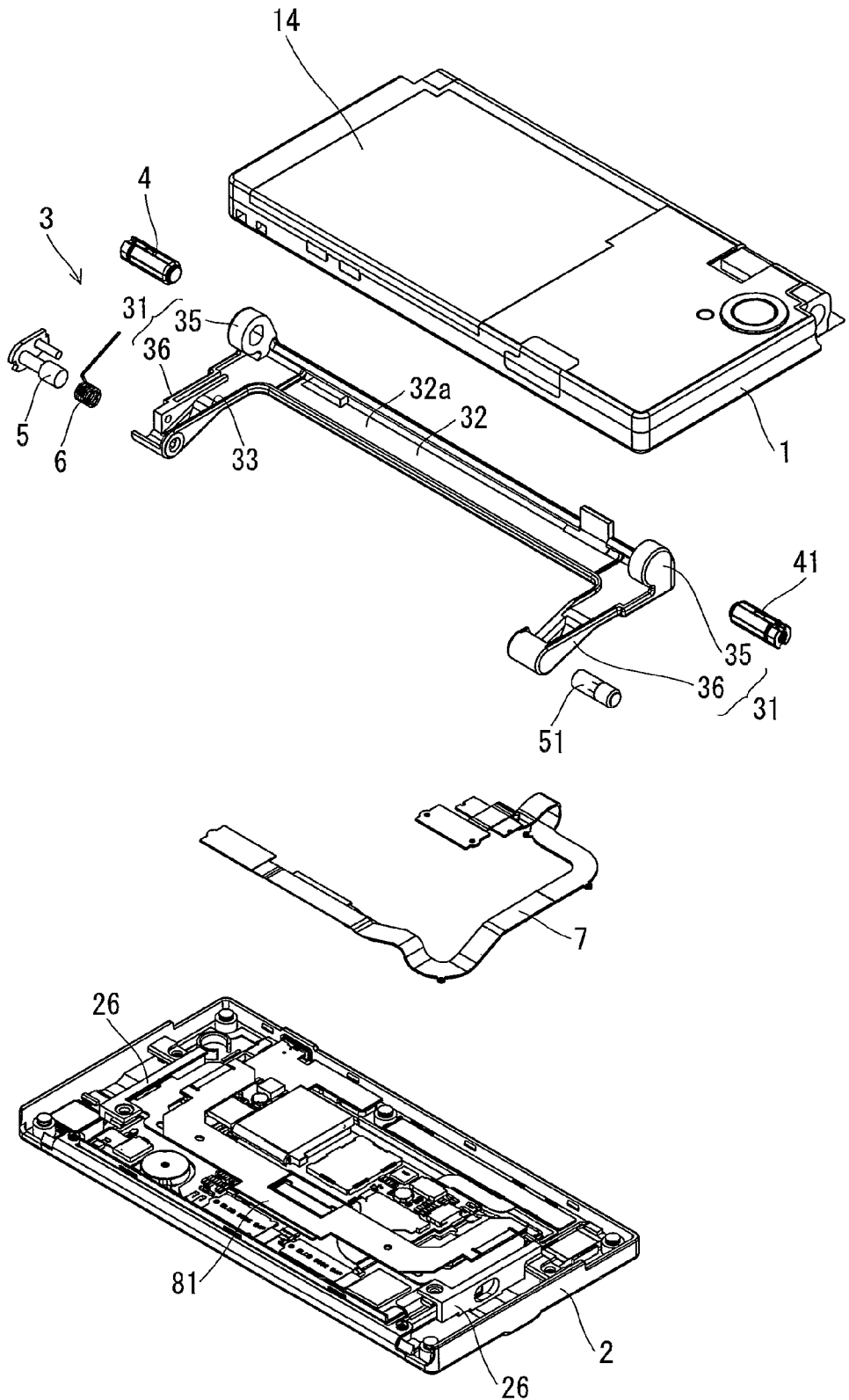
FIG. 11 is a perspective view illustrating the portable electronic apparatus, wherein a portion thereof is further exploded from the state of FIG. 10.

The coupling mechanism (3) which couples the first casing (1) and the second casing (2) to each other includes a U-shaped coupling member (32) constituted by an arm coupling portion (32a) extending leftwardly and rightwardly, and a pair of left and right coupling arms (31)(31) which extend in the forward and rearward directions and protrude from the opposite end portions of the arm coupling portion (32a), as illustrated in FIG. 9 and FIG. 10.

Each coupling arm (31) is of an L type which is bent in an L shape in a plane orthogonal to the image display surfaces of both the casings and, also, is constituted by a first arm portion (35) and a second arm portion (36) which intersect with each other at the angular portion of the L shape.

The right coupling arm (31) is coupled, at its base end portion (the base end portion of the first arm portion (35)), to the rear end portion of the right side surface of the first casing (1) through a well-known type hinge unit (4) incorporating a spring and a cam mechanism. The left coupling arm (31) is coupled, at its base end portion (the base end portion of the first arm portion (35)), to the rear end portion of the left side surface of the first casing (1) through a dummy hinge unit (41) incorporating neither a spring nor a cam mechanism.

Further, the right coupling arm (31) is coupled, at its tip end portion (the tip end portion of the second arm portion (36)), to the right end portion of the rear surface of the second casing (2) through a first hinge member (5). The left coupling arm (31) is coupled, at its tip end portion (the tip end portion of the second arm portion (36)), to the left end portion of the rear surface of the second casing (2) through a second hinge member (51).

Both the hinge members (5)(51) are housed in rear portions of the second casing (2), as illustrated in FIG. 18.

The hinge units (4)(41) form a first pivot shaft which couples the base end portions of the coupling arms (31) to the first casing (1), while the hinge members (5) (51) form a second pivot shaft which couples the tip end portions of the coupling arms (31) to the second casing (2), such that the first pivot shaft and the second pivot shaft are parallel to each other.

Further, the electronic components incorporated in the first casing (1) and the electronic components incorporated in the second casing (2) are connected to each other through a flexible lead (7). The flexible lead (7) extends from the inside of the second casing (2) to the inside of the first casing (1) through the inside of a coupling arm (31). Further, the length of the flexible lead (7) includes leeway which allows the first casing (1) and the second casing (2) to move relative to each other.

This allows the second casing (2) to perform a series of movements relative to the first casing (1) as illustrated in FIGS. 27(a) to (d) and FIGS. 28(a) to (c).

In the tilt state illustrated in FIG. 3 and FIG. 4, the hinge unit (4) softly locks the coupling member (32) with respect to the first casing (1) and, also, biases the coupling member (32) toward the rotational angle of the tilt state, within a certain angle range centered at the rotational angle of the tilt state. Further, the hinge unit (4) biases the coupling member (32) toward the rotational angle of the rotational full-open state, within a certain angle range including the rotational angle of the rotational full-open state illustrated in FIG. 5 and FIG. 6.

Further, in the rotational full-open state illustrated in FIG. 5 and FIG. 6, the coupling member (32) is received by the first casing (1), so that the coupling member (32) is held at the rotational angle of the rotational full-open state.

As illustrated in FIG. 9, a torsion spring (6) is mounted in the first hinge member (5) about the rotational shaft (the second pivot shaft) thereof, and the torsion spring (6) biases the second casing (2) in such a direction as to reduce the angle θ of opening in the tilt state illustrated in FIG. 28(b).

Further, as illustrated in FIG. 10, the first casing (1) is provided, at the rear end portions of its opposite side surfaces, with housing portions (103)(103) with concave shapes to house the first arm portions (35)(35) of the coupling arms (31)(31) of the coupling member (32).

On the other hand, the second casing (2) is provided, at the opposite side portions of its rear surface, with housing portions (204) (203) (203) with concave shapes to house the arm coupling portion (37) and the second arm portions (36)(36) of the coupling member (32).

Further, as illustrated in FIG. 10, both the coupling arms (31)(31) of the coupling member (32) are provided with respective receiving surfaces (33) for receiving the second casing (2), at their portions facing the second casing (2) and, also, the second casing (2) is provided, at the opposite end portions of its rear surface, with respective sliding surfaces (29) to slidably come into contact with the receiving surfaces (33).

In the tilt state illustrated in FIG. 3 and FIG. 4 and in the rotational full-open state illustrated in FIG. 5 and FIG. 6, the sliding surfaces (29) in the second casing (2) come into contact with the receiving surfaces (33) in the coupling arm (31) to receive the rotation of the second casing (2) with respect to the coupling arms (31), as illustrated in FIG. 23(a), so that the attitude of the second casing (2) with respect to the coupling arms (31) is defined in the tilt state and in the rotational full-open state.

Figure 12:
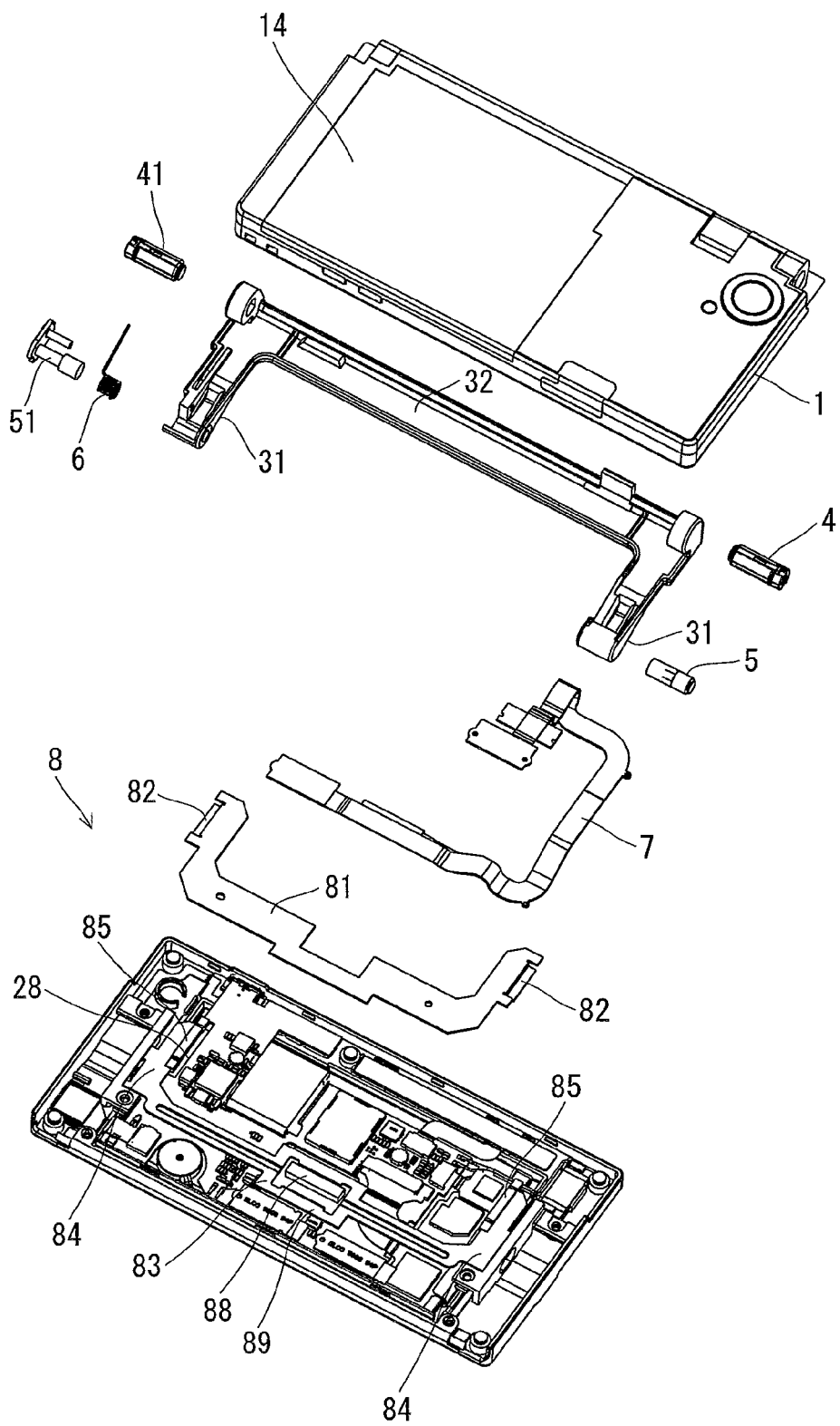
FIG. 12 is a perspective view illustrating the portable electronic apparatus, wherein a portion thereof is further exploded from the state of FIG. 11.

As illustrated in FIG. 12, on a rear-surface panel (28) forming the second casing (2), there is provided a U-shaped sliding member (83) which is slidable forwardly and rearwardly and, also, there is fixed a U-shaped supporting member (81) covering the sliding member (83). The sliding member (83) is provided with supporting arm portions (84) (84) protruding from its opposite end portions in the left and right sides, and each supporting arm portion (84) is provided with a sliding guide portion (85). Further, sliding portions (82)(82) are mounted to the supporting member (81) at its opposite end portions in the left and right sides.

Further, the sliding guide portions (85)(85) provided in the supporting arm portions (84) (84) are sandwiched between the rear-surface panel (28) and the sliding portions (82)(82) of the supporting member (81), so that the sliding of the sliding member (83) in the forward and rearward directions on the rear-surface panel (28) is guided as shown in FIG. 17.

Figure 21:
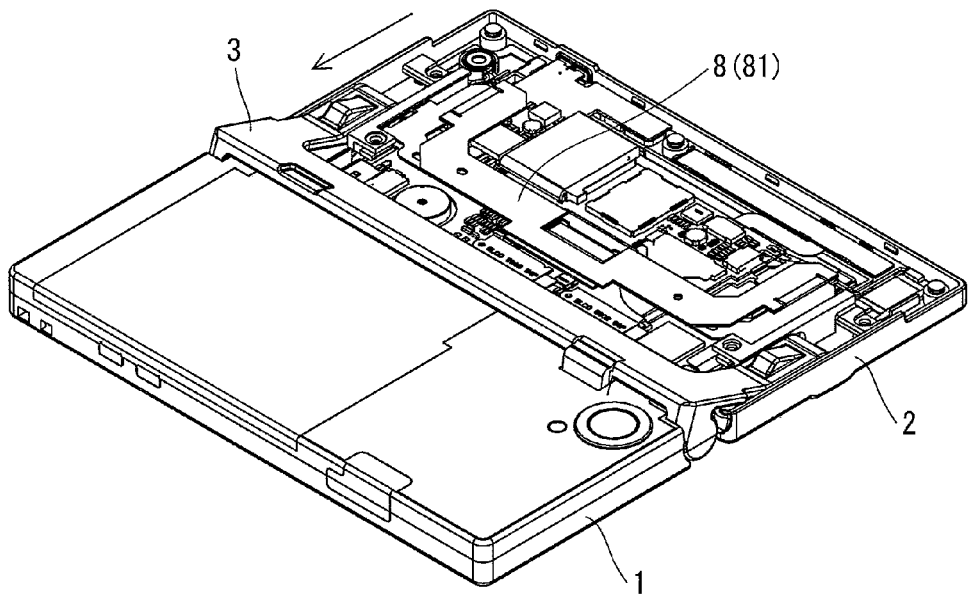
FIG. 21 is a perspective view illustrating the portable electronic apparatus, wherein a portion thereof is further exploded from the state of FIG. 6.
Figure 22:
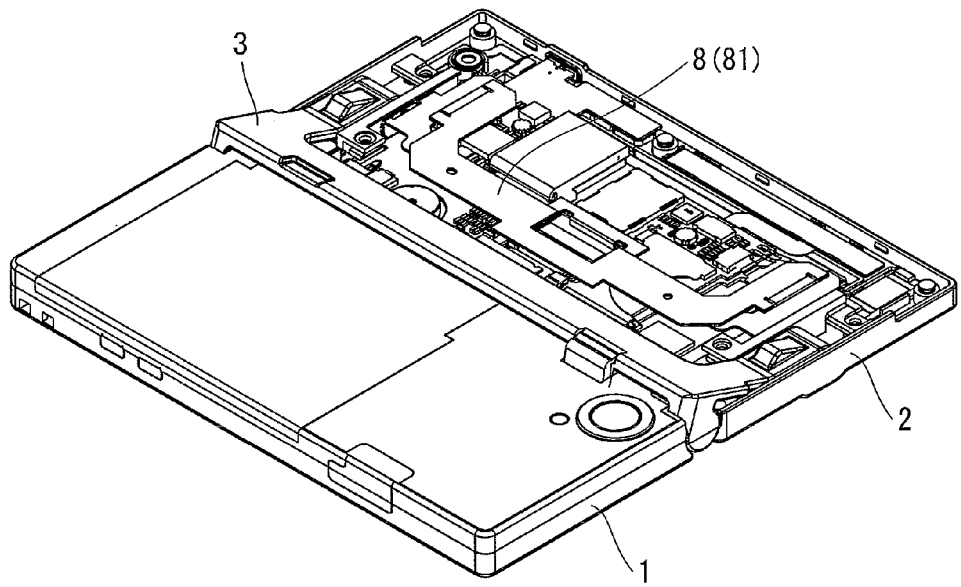
FIG. 22 is a perspective view illustrating the portable electronic apparatus, wherein a portion thereof is further exploded from the state of FIG. 8.

Accordingly, there is structured a sliding mechanism (8) for sliding the second casing (2) in the forward and rearward directions with respect to the supporting arm portions (84) (84), so that the second casing (2) is enabled to slide forwardly and rearwardly, between the rotational full-open state illustrated in FIG. 5, FIG. 6 and FIG. 21 and the sliding full-open state illustrated in FIG. 7, FIG. 8 and FIG. 22.

Figure 15:
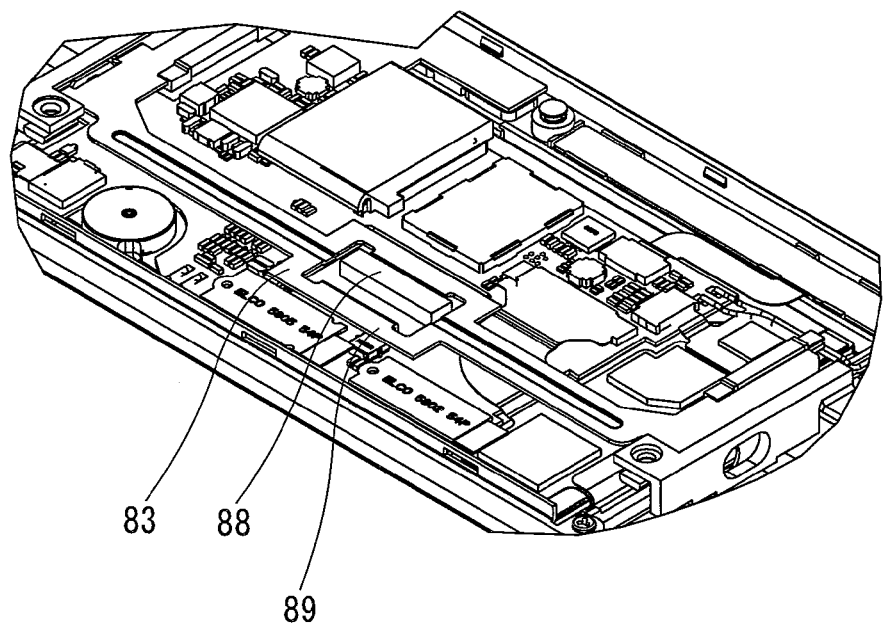
FIG. 15 is a perspective view illustrating a magnet on the second casing.
Figure 16:
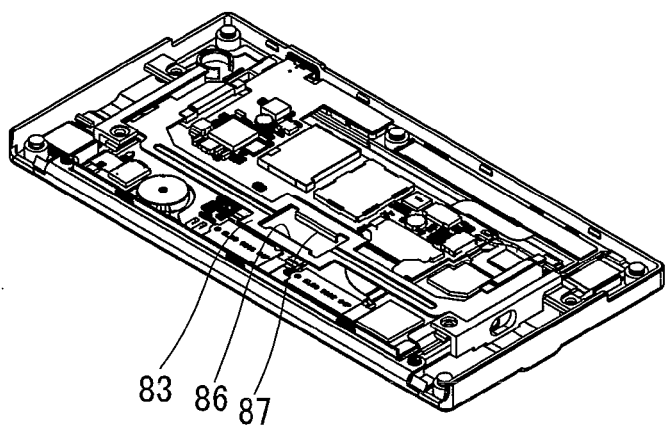
FIG. 16 is a perspective view illustrating a sliding member on the second casing.

Further, a magnet (88) is installed on the rear-surface panel (28), while the sliding member (83) is provided, at a center portion thereof, with a frame portion (89) which surrounds the magnet (88), as in FIG. 15. This frame portion (89) is provided with a pair of protruding pieces (86)(87) as in FIG. 16, at the front and the rear of the magnet (88).

Figure 20:
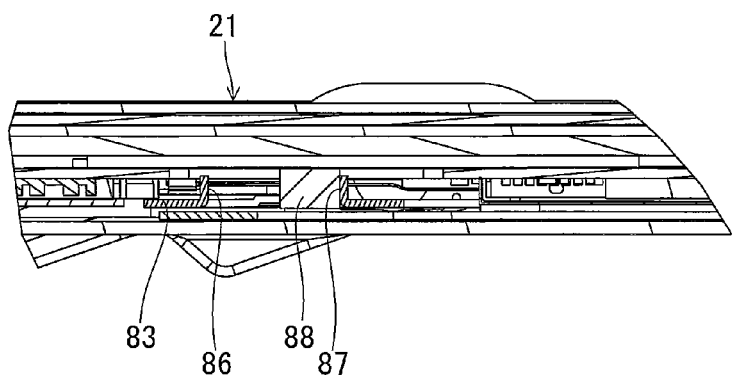
FIG. 20 is a cross-sectional view illustrating the second casing, by enlarging a portion thereof.

When the sliding member (83) slides forwardly and rearwardly as described above, one protruding piece, out of the pair of protruding pieces (86)(87), comes into contact with the magnet (88) as in FIG. 20.

As a result thereof, in the rotational full-open state illustrated in FIG. 5 and FIG. 6 and in the sliding full-open state illustrated in FIG. 7 and FIG. 8, one of the pair of protruding pieces (86)(87) is attracted and attached to the magnet (88), so that, due to its magnetic attractive force, the position to which the second casing (2) slides is held in the rotational full-open state or in the sliding full-open state.

The rear end surface of the first casing (1) and the front end surface of the second casing (2), which are faced to each other in the rotational full-open state, are provided with a convex portion (10) and a concave portion (20), respectively, which can be detachably engaged with each other, as illustrated in FIGS. 24(a) (b). In the rotational full-open state illustrated in FIG. 24(a) and FIG. 25(a), the convex portion (10) and the concave portion (20) are disengaged from each other, but in the sliding full-open state illustrated in FIG. 24(b) and FIG. 25(b), the convex portion (10) and the concave portion (20) are engaged with each other.

As a result thereof, in the sliding full-open state illustrated in FIG. 24(b) and FIG. 25(b), the first casing (1) and the second casing (2) are coupled to each other through the engagement between the convex portion (10) and the concave portion (20), so that they are maintained at a state where the first image display surface (11) and the second image display surface (21) are flushed with each other in the same plane.

In the rotational full-open state, as illustrated in FIG. 24(a) and FIG. 25(a), a gap T with a sufficient size (for example, several millimeters) is provided between the metal plate (101) forming the first casing (1) and the metal plate (201) forming the second casing (2). However, in the sliding full-open state, as illustrated in FIG. 24(b) and FIG. 25(b), both the metal plates (101) (201) come into contact with each other or are faced to each other with a small interval (for example, 0.1 mm) interposed therebetween.

In the sliding full-open state, the sizes of respective portions illustrated in FIG. 26 are set as follows; a: 2.55 mm, b: 0.2 mm, c: 0.05 mm, d: 0.15 mm, e: 1.1 mm, f: 0.3 mm, g: 0.2 mm, h: 0.5 mm, and i: 0.05 mm, for example.

In this case, the size a is the distance from the end faces of the cabinets to the image display areas in the displays (12) (22), the size b is the distance from the end edges of the image display surfaces (11) (21) to the image display areas, the size h is the thickness of the metal plates (101) (201), and the size i is the amount of recession of the metal plates (101) (201) from the cabinet surfaces.

The portable electronic apparatus is capable of being selectively set in four states as follows: the full-closed state where the first casing (1) and the second casing (2) are overlaid on each other such that only the second image display surface (21) is exposed as illustrated in FIG. 1 and FIG. 2; the tilt state where the second casing (2) has been rearwardly moved from the full-closed state so that both the first image display surface (11) and the second image display surface (21) are exposed and, also, the second image display surface (21) is inclined with respect to the first image display surface (11) at an angle of opening which is equal to or more than 90 degrees but less than 180 degrees as illustrated in FIG. 3 and FIG. 4; the rotational full-open state where the second casing (2) has been rearwardly rotated from the tilt state so that both the first image display surface (11) and the second image display surface (21) are exposed in the same plane as illustrated in FIG. 5 and FIG. 6; and the sliding full-open state where the second casing (2) has been slid toward the first casing (1) from the rotational full-open state, and both the image display surfaces (11)(21) are exposed in the same plane at positions where the first image display surface (11) and the second image display surface (21) are closer to each other as illustrated in FIG. 7 and FIG. 8.

In the full-closed state illustrated in FIG. 1 and FIG. 2, the first arm portions (35) (35) of the coupling arms (31) (31) are housed in the housing portions (103)(103) in the first casing (1) illustrated in FIG. 10 and, also, the arm coupling portion (37) and the second arm portions (36)(36) of the coupling member (32) are housed in the housing portions (204), (203) (203) in the second casing (2), so that the coupling mechanism (3) is not protruded from the opposite side surfaces and the rear end surfaces of both the casings (1) (2) and, thus, the entire apparatus is compacted.

In any of the tilt state illustrated in FIG. 3, the rotational full-open state illustrated in FIG. 5 and the sliding full-open state illustrated in FIG. 7, the coupling mechanism (3) is hidden substantially in its entirety behind the rear surfaces of both the casings (1)(2) and, therefore, it is hard to view the protruding portion of the coupling mechanism (3) along an usual user's line of sight (an arrow S in FIG. 1).

As illustrated in FIGS. 27(a) to (d) and FIGS. 28(a) to (d), in processing for shifting the portable electronic apparatus from the full-closed state to the sliding full-open state through the tilt state and the rotational full-open state, if the second casing (2) is pushed rearwardly to be slightly moved from the full-closed state illustrated in FIG. 27(a), the second casing (2), thereafter, is rotated in the counterclockwise direction as indicated by a broken-line arrow due to the biasing by the torsion spring (6) and, along therewith, the coupling arms (31) are rotated in the clockwise direction as indicated by a solid-line arrow, as illustrated in (b) to (d) in the same figure.

Thus, the second casing (2) is rearwardly moved, while the second image display surface (21) is kept oriented upwardly or obliquely upwardly.

Further, at a time point slightly after the state of FIG. 27(d), the coupling arms (31) are further rotated in the clockwise direction, due to the biasing by the hinge unit (4), as in FIG. 28(a), and, then, are softly locked at the rotational angle of the tilt state as in (b) in the same figure. Further, the second casing (2) is rotated in the counterclockwise direction due to the biasing by the torsion spring (6) and is held at the attitude in the tilt state illustrated in FIG. 28(b) since the sliding surfaces (29) come into contact with the receiving surfaces (33) in the coupling arms (31).

Accordingly, if the user merely pushes the second casing (2) rearwardly at the full-closed state illustrated in FIG. 27(a) to slightly move the second casing (2), then, the second casing (2) automatically moves to the tilt state illustrated in FIG. 28(b).

Next, if the second casing (2) is pushed rearwardly to slightly rotate the coupling arms (31) in the clockwise direction in the tilt state illustrated in FIG. 28(b), then the coupling arms (31) are rotated to the rotational angle of the rotational full-open state illustrated in FIG. 28(c) due to the biasing by the hinge unit (4) and are received by the first casing (1) at this rotational angle, while the sliding surfaces (29) in the second casing (2) are kept in contact with the receiving surfaces (33) in the coupling arms (31).

Along with this rotation of the coupling arms (31), the second casing (2) is rearwardly rotated and, finally, the first image display surface (11) and the second image display surface (21) are aligned in the same plane.

Further, if the second casing (2) is pulled toward the first casing (1) in the rotational full-open state illustrated in FIG. 28(c), the sliding surfaces (29) in the second casing (2) slide on the receiving surfaces (33) in the coupling arms (31) as illustrated in FIGS. 23(a) (b), so that the second casing (2) horizontally moves to a sliding full-open position illustrated in FIG. 28(d) and, finally, comes into contact with the first casing (1).

As a result thereof, as illustrated in FIG. 7, the first image display surface (11) and the second image display surface (21) get closer to each other, so that both the image display surfaces (11)(21) form a single large screen.

In the sliding full-open state, as illustrated in FIG. 24(b), the convex portion (10) in the first casing (1) and the concave portion (20) in the second casing (2) are engaged with each other, so that both the casings (1)(2) are coupled to each other. Accordingly, even if an operation for strongly touching the second image display surface (21) is performed in this state, the second casing (2) is maintained at a certain attitude with respect to the first casing (1).

As illustrated in FIG. 26, there is provided a structure which causes the metal plates (101)(201) in both the casings (1)(2) to face each other in the sliding full-open state. Accordingly, in comparison with a common structure which causes cabinets made of a synthetic resin to face each other without employing such metal plates (101)(201), it is possible to reduce the interval between the first display (12) and the second display (22), by the difference (1.4 mm) between the thickness of the metal plates (0.5 mm×2) and the thickness of such cabinets made of a synthetic resin (1.2 mm×2).

Further, when the portable electronic apparatus is placed on a desk in the tilt state as illustrated in FIG. 29(a) or when the portable electronic apparatus is placed on a desk in the sliding full-open state as illustrated in FIG. 29(b), the angular portions of the coupling arms (31) are protruded further than the rear surface of the first casing (1), so that the front end portion of the first casing (1) and the angular portions of the coupling arms (31) are grounded.

In this case, the L shape of the coupling arms (31) and the placement of the components with respect to the first casing (1) and the second casing (2) are designed, such that the center of gravity G is positioned in the firs casing (1) side with respect to the grounded points of the coupling arms (31) as illustrated in the figure, in any state. This enables stabilization of the attitudes of both the casings (1)(2).

Accordingly, when the portable electronic apparatus is placed on a desk in the tilt state as illustrated in FIG. 29(a), it is possible to operate the touch panel (13) in the first casing (1) in the front side, while viewing the display (12) in the second casing (2) in the rear side.

Further, when the portable electronic apparatus is placed on a desk in the sliding full-open state as illustrated in FIG. 29(b), both the image display surfaces (11)(21) take such attitudes as to be slightly oriented toward the user side depending on the amount of the protrusion of the angular portions of the coupling arms (31) and, for example, both the image display surfaces (11)(21) form a single screen, which enables viewing images on the large screen. In this case, both the image display surfaces (11) (21) are sufficiently close to each other, which enables displaying images with substantially no discontinuities, on both the image display surfaces (11)(21).

DESCRIPTION OF REFERENCE CHARACTERS (1) First casing
(11) First image display surface
(2) Second casing
(21) Second image display surface
(29) Sliding surface
(3) Coupling mechanism
(31) Coupling arm
(35) First arm portion
(36) Second arm portion
(33) Receiving surface
(4) Hinge unit
(5) Hinge member
(6) Torsion spring
(7) Flexible lead
(8) Sliding mechanism
(83) Sliding member
(88) Magnet
(101) Metal plate
(201) Metal plate

The invention claimed is:

1. A portable electronic apparatus comprising—a first casing and a second casing which are coupled to each other through a coupling mechanism, both the casings being provided with respective image display surfaces in their surfaces, the portable electronic apparatus configured to be selectively set in three states which are
   a full-closed state where both the casings are overlaid on each other,
   a tilt state where the second casing has been moved from the full-closed state so that the image display surfaces in both the casings are exposed and, also, the image display surface in the second casing is inclined with respect to the image display surface in the first casing at an angle of opening which is equal to or more than 90 degrees but less than 180 degrees, and
   a full-open state where the image display surfaces in both the casings are flush with each other in the same plane, and
   wherein the portable electronic apparatus holds the second casing, in attitude, with respect to the first casing, in the full-closed state, in the tilt state, and in the full-open state; and
   a sliding mechanism configured to, while the first and second casings are in the full-open state, slide the second casing toward the first casing while the image display surfaces of the first and second casings are within the same plane,
   wherein the coupling mechanism includes a coupling arm which is coupled, at its base end portion, to the first casing through a first pivot shaft, and is coupled, at its tip end portion, to the second casing through a second pivot shaft that is parallel with the first pivot shaft, and wherein the coupling arm rotates between a rotational angle of the full-closed state and a rotational angle of the full-open state,
   wherein the sliding mechanism includes a sliding member which is slidably provided in the second casing, and wherein the coupling arm is pivotally supported at its tip end portion by the sliding member, and
   wherein the coupling arm and the second casing are provided with a receiving surface and a sliding surface, respectively, which slidably come into contact with each other in the full-open state, wherein the second casing is rotationally biased in a direction to contact the sliding surface with the receiving surface of the coupling arm, and wherein the sliding surface in the second casing slides on the receiving surface in the coupling arm during processing for sliding the sliding member.

2. A portable electronic apparatus comprising: a first casing and a second casing which are coupled to each other through a coupling mechanism, both the casings being provided with respective image display surfaces in their surfaces, wherein the first casing and the second casing are coupled to each other such that they can move with respect to each other, among a full-closed state where the image display surface in the first casing is covered with a rear surface of the second casing and, also, the image display surface in the second casing is exposed, a tilt state where the second casing has been moved from the full-closed state so that the image display surfaces in both the casings are exposed and, also, the image display surface in the second casing is inclined with respect to the image display surface in the first casing at an angle of opening which is equal to or more than 90 degrees but less than 180 degrees, and a full-open state where the second casing has been moved from the tilt state so that the image display surfaces in both the casings are exposed in the same plane, and wherein the portable electronic apparatus comprises state transition means which causes transitions among the full-closed state, the tilt state, and the full-open state, and the state transition means softly locks the second casing, in attitude, with respect to the first casing in the tilt state and causes the second casing to engage, at an end portion thereof, with an end portion of the first casing such that they can be engaged with and disengaged from each other in the full-open state; and a sliding mechanism configured to, while the first and second casings are in the full-open state, slide the second casing toward the first casing while the image display surfaces of the first and second casings are within the same plane, wherein the coupling mechanism includes a coupling arm which is coupled, at its base end portion, to the first casing through a first pivot shaft, and is coupled, at its tip end portion, to the second casing through a second pivot shaft parallel with the first pivot shaft, and wherein the coupling arm rotates between a rotational angle of the full-closed state and a rotational angle of the full-open state, wherein the sliding mechanism includes a sliding member which is slidably provided in the second casing, and wherein the coupling arm is pivotally supported at its tip end portion by the sliding member, and wherein the coupling arm and the second casing are provided with a receiving surface and a sliding surface, respectively, which slidably come into contact with each other in the full-open state, wherein the second casing is rotationally biased in a direction to contact the sliding surface with the receiving surface of the coupling arm, and wherein the sliding surface in the second casing slides on the receiving surface in the coupling arm during processing for sliding the sliding member.

3. A portable electronic apparatus comprising a first casing and a second casing which are coupled to each other, both the casings being provided with respective image display surfaces in their surfaces, the portable electronic apparatus comprising:

a coupling arm which is coupled, at its base end portion, to the first casing through a first pivot shaft and also is coupled, at its tip end portion, to the second casing through a second pivot shaft parallel to the first pivot shaft, the coupling arm coupling both the casings such that they can move with respect to each other, among a full-closed state in which the image display surface in the first casing is covered with a rear surface of the second casing and the image display surface in the second casing is exposed, a tilt state in which the second casing has been moved from the full-closed state so that the image display surfaces in both the casings are exposed and the image display surface in the second casing is inclined with respect to the image display surface in the first casing at an inclination angle which is equal to or more than 90 degrees but less than 180 degrees, and a full-open state where the second casing has been moved from the tilt state so that the image display surfaces in both the casings are exposed in the same plane;

a biasing portion which rotationally biases the second casing in a single direction with respect to the coupling arm, about the second pivot shaft;

a receiving portion which is provided on the coupling arm and is configured to hold the second casing at the inclination angle of the tilt state, against the rotational biasing by the biasing portion;

a soft locking portion configured to, when the coupling arm has rotated to a rotational angle of the tilt state about the first pivot shaft, softly lock the coupling arm at this rotational angle;

an engagement portion configured to engage an end portion of the second casing, with an end portion of the first casing, such that the casings can be engaged with and disengaged from each other, in a state where the coupling arm has rotated to a rotational angle of the full-open state about the first pivot shaft and, thus, the image display surfaces in both the casings are flush with each other in the same plane;

and a sliding mechanism configured to, while the first and second casings are in the full-open state, slide the second casing toward the first casing while the image display surfaces of the first and second casings are within the same plane.

4. The portable electronic apparatus according to claim 3, wherein the coupling arm is provided on each of left and right end portions of the first casing and the second casing, and each coupling arm is coupled, at its base end portion, to a side portion of the first casing through the first pivot shaft and, also, is coupled, at its tip end portion, to a rear portion of the second casing through the second pivot shaft.

5. The portable electronic apparatus according to claim 3, wherein the biasing portion rotationally biases the second casing in such a direction as to reduce the angle of opening of the image display surface in the second casing, in the tilt state.

6. The portable electronic apparatus according to claim 3, wherein the receiving portion comprises a receiving surface which is formed between the base end portion and the tip end portion of the coupling arm and which, in the tilt state, contacts a portion of the rear surface of the second casing.

7. The portable electronic apparatus according to claim 3, wherein the soft locking portion comprises a hinge unit which biases the coupling arm, with respect to the first casing, toward the rotational angle of the tilt state, within a certain angle range centered at the rotational angle of the tilt state.

8. A portable electronic apparatus comprising: a first casing and a second casing which are coupled to each other through a coupling mechanism, both the casings being provided with respective image display surfaces in their surfaces, the portable electronic apparatus configured to be selectively set in at least two states which are a full-closed state where the image display surface in the first casing is covered with a rear surface of the second casing and, also, the image display surface in the second casing is exposed, and a full-open state where the second casing has been moved from the full-closed state so that the image display surfaces in both the casings are exposed in the same plane; and a sliding mechanism configured to, while the first and second casings are in the full-open state, slide the second casing toward the first casing while the image display surfaces of the first and second casings are within the same plane, wherein the coupling mechanism includes a coupling arm which couples the first casing and the second casing to each other such that the casings can move with respect to each other between the full-closed state and the full-open state, and one or both of the casings is provided with a housing portion with a concave shape to house the coupling arm in the full-closed state, wherein the sliding mechanism includes a sliding member which is slidably provided in the second casing, and wherein the coupling arm is pivotally supported at its tip end portion by the sliding member, and wherein the coupling arm and the second casing are provided with a receiving surface and a sliding surface, respectively, which slidably come into contact with each other in the full-open state, wherein the second casing is rotationally biased in a direction to contact the sliding surface with the receiving surface of the coupling arm, and wherein the sliding surface in the second casing slides on the receiving surface in the coupling arm during processing for sliding the sliding member.

9. A portable electronic apparatus comprising: a first casing and a second casing which are coupled to each other through a coupling mechanism, both the casings being provided with respective image display surfaces in their surfaces, the portable electronic apparatus configured to be selectively set in at least two states which are a full-closed state where the image display surface in the first casing is covered with a rear surface of the second casing and, also, the image display surface in the second casing is exposed, and a full-open state where the second casing has been moved from the full-closed state so that the image display surfaces in both the casings are exposed in the same plane; and a sliding mechanism configured to, while the first and second casings are in the full-open state, slide the second casing toward the first casing while the image display surfaces of the first and second casings are within the same plane, wherein the coupling mechanism includes a pair of coupling arms provided on both the casings at their opposite end portions in leftward and rightward directions which are orthogonal to the direction of the coupling between both the casings, wherein each coupling arm has an L shape which is bent in an L form in a plane intersecting with the image display surfaces in both the casings, wherein each coupling arm includes a first arm portion and a second arm portion intersecting with each other at the angular portion of the L shape, such that the first arm portion is coupled, at an end portion thereof, to the first casing through a first pivot shaft, and the second arm portion is coupled, at an end portion thereof, to the second casing through a second pivot shaft parallel to the first pivot shaft, wherein the first casing comprises, at rear end portions of its opposite side surfaces, housing portions with concave shapes to house the first arm portions of the pair of coupling arms in the full-closed state, wherein the second casing comprises, at opposite side portions of its rear surface, housing portions with concave shapes to house the second arm portions of the pair of coupling arms in the full-closed state, wherein the sliding mechanism includes a sliding member which is slidably provided in the second casing, and wherein the coupling arm is pivotally supported at its tip end portion by the sliding member, and wherein the coupling arm and the second casing are provided with a receiving surface and a sliding surface, respectively, which slidably come into contact with each other in the full-open state, wherein the second casing is rotationally biased in a direction to contact the sliding surface with the receiving surface of the coupling arm, and wherein the sliding surface in the second casing slides on the receiving surface in the coupling arm during processing for sliding the sliding member.

10. The portable electronic apparatus according to claim 9, wherein the pair of coupling arms are coupled to each other at their angular portions, through an arm coupling portion, to form an integrated coupling member, and the second casing is provided, at a rear end portion of its rear surface, with a housing portion with a concave shape to house the arm coupling portion in the full-closed state.

11. A portable electronic apparatus comprising a first casing and a second casing which are coupled to each other through a coupling mechanism, both the casings being provided with respective image display surfaces in their surfaces, the portable electronic apparatus configured to be selectively set in at least two states which are a full-closed state where the image display surface in the first casing is covered with a rear surface of the second casing and, also, the image display surface in the second casing is exposed, and a full-open state where the second casing has been moved from the full-closed state so that the image display surfaces in both the casings are exposed in the same plane, wherein the portable electronic apparatus comprises a sliding mechanism configured to, while the first and second casings are in the full-open state, slide the second casing toward the first casing while the image display surfaces are within the same plane, wherein the coupling mechanism includes a coupling arm which is coupled, at its base end portion, to the first casing through a first pivot shaft and, also, is coupled, at its tip end portion, to the second casing through a second pivot shaft parallel with the first pivot shaft, the coupling arm can rotate between a rotational angle of the full-closed state and a rotational angle of the full-open state, the sliding mechanism includes a sliding member which is slidably provided in the second casing, the coupling arm is pivotally supported at its tip end portion by the sliding member, the coupling arm and the second casing are provided with a receiving surface and a sliding surface, respectively, which are to slidably come into contact with each other in the full-open state, and the sliding surface in the second casing slides on the receiving surface in the coupling arm during processing for sliding the sliding member.

12. The portable electronic apparatus according to claim 11, wherein the sliding mechanism is interposed between the coupling mechanism and the second casing.

13. The portable electronic apparatus according to claim 11, wherein out of cabinet walls forming the first casing and the second casing, two end surface walls which are to get closer to or separate from each other along with sliding through the sliding mechanism in the full-open state are formed from metal plates.

14. The portable electronic apparatus according to claim 11, wherein both the casings are provided with respective engagement mechanisms which are engaged with and disengaged from each other, at their opposing portions which are to get closer to or separate from each other along with sliding through the sliding mechanism in the full-open state.

* * * * *